(12) United States Patent
Saroka

(10) Patent No.: US 11,371,236 B2
(45) Date of Patent: Jun. 28, 2022

(54) WALL MOUNTING SYSTEM WITH LEDGE

(71) Applicant: Goldray Industries Ltd., Calgary (CA)

(72) Inventor: Michael Saroka, Calgary (CA)

(73) Assignee: Goldray Industries Ltd., Calgary (CA)

( * ) Notice: Subject to any disclaimer, the term of this patent is extended or adjusted under 35 U.S.C. 154(b) by 0 days.

(21) Appl. No.: 16/820,575

(22) Filed: Mar. 16, 2020

(65) Prior Publication Data

US 2020/0291636 A1    Sep. 17, 2020

Related U.S. Application Data

(60) Provisional application No. 62/819,163, filed on Mar. 15, 2019.

(51) Int. Cl.
*E04B 1/24* (2006.01)
*E04B 2/74* (2006.01)

(52) U.S. Cl.
CPC .......... *E04B 1/2403* (2013.01); *E04B 2/7453* (2013.01); *E04B 2001/2415* (2013.01); *E04B 2001/2418* (2013.01); *E04B 2001/2481* (2013.01)

(58) Field of Classification Search
CPC . E04F 13/0869; E04F 13/144; E04F 13/0835; E04F 13/0894; E04B 1/2403; E04B 2/7453; E04B 2001/2481; E04B 2001/2418; E04B 2001/2415; E04B 2/7457; F16B 5/01; F16B 5/06
See application file for complete search history.

(56) References Cited

U.S. PATENT DOCUMENTS

| | | | | |
|---|---|---|---|---|
| 2,887,870 A * | 5/1959 | Slowinski | ............. | E04B 2/7457 52/242 |
| 3,066,367 A * | 12/1962 | Garman | ................ | H02B 1/015 248/222.11 |
| 3,117,353 A * | 1/1964 | Edwards | ............. | E04F 13/0835 403/403 |
| 3,180,459 A * | 4/1965 | Liskey, Jr. | ............ | E04B 2/7453 52/474 |
| 3,621,625 A * | 11/1971 | Medow | ................ | E04F 13/147 52/314 |
| 3,968,610 A * | 7/1976 | Medow | ............... | E04F 13/0871 52/314 |
| 4,223,490 A * | 9/1980 | Medow | .................. | E04F 13/08 52/314 |

(Continued)

*Primary Examiner* — Rodney Mintz
(74) *Attorney, Agent, or Firm* — Ridout and Maybee LLP

(57) ABSTRACT

A system for mounting a load to a wall frame is disclosed. The system has upper and lower mounting systems. Each of the upper and lower mounting systems has a wall bracket and a load bracket. The wall brackets of the upper and lower mounting systems each include a retaining flange, and are configured to be mounted to the wall frame. While the wall brackets of the upper and lower mounting systems are mounted to the wall frame, a space is defined between the wall and the retaining flanges. The wall bracket of the lower mounting system includes a ledge that is configured to support the load. The load brackets of the upper and lower mounting systems each include a retainable flange, and are configured to be mounted to the load. While the load is mounted to the wall, the weight of the load is supported by the ledge.

66 Claims, 16 Drawing Sheets

(56) References Cited

U.S. PATENT DOCUMENTS

| | | | | |
|---|---|---|---|---|
| 5,069,014 A | * | 12/1991 | Kubbutat | E04F 13/145 |
| | | | | 52/235 |
| 7,089,708 B1 | * | 8/2006 | Bostock | B66B 11/0253 |
| | | | | 52/392 |
| 7,587,871 B2 | * | 9/2009 | Perry | E04F 13/185 |
| | | | | 52/536 |
| 8,359,811 B2 | * | 1/2013 | Muller | E04F 13/0819 |
| | | | | 52/747.12 |
| 9,016,020 B1 | * | 4/2015 | Yang | E04F 13/072 |
| | | | | 52/511 |
| 9,169,653 B2 | * | 10/2015 | Porter | E04F 13/0816 |
| 9,609,964 B1 | * | 4/2017 | Munson | F16M 13/02 |
| 9,695,596 B2 | * | 7/2017 | McIntosh | E04C 2/38 |
| 2006/0191228 A1 | * | 8/2006 | Perry | E04F 13/185 |
| | | | | 52/506.01 |
| 2006/0254171 A1 | * | 11/2006 | Bostock | E04F 13/0864 |
| | | | | 52/392 |
| 2008/0155928 A1 | * | 7/2008 | Weiss | E04F 13/0864 |
| | | | | 52/546 |
| 2011/0047916 A1 | * | 3/2011 | Muller | E04F 13/0819 |
| | | | | 52/477 |
| 2014/0083033 A1 | * | 3/2014 | McIntosh | E04C 2/288 |
| | | | | 52/302.1 |
| 2015/0275527 A1 | * | 10/2015 | Porter | E04F 13/083 |
| | | | | 52/701 |
| 2019/0085567 A1 | * | 3/2019 | Attebery, II | E04C 2/38 |
| 2020/0354968 A1 | * | 11/2020 | Attebery, II | E04F 13/0835 |

\* cited by examiner

WALL MOUNTING SYSTEM WITH LEDGE

FIELD

The present disclosure relates to systems and methods for securing a load to a wall frame.

BACKGROUND

It may be desirable to secure a load, such as a glass panel, cabinet, shelf, or picture frames, to a wall frame. The wall itself may be constructed by securing wall panels to studs.

One way to secure a load to a wall frame is to use conventional fasteners, such as screws or nails. Unfortunately, loads that are secured to a wall frame in such a manner may not be strongly secured to the wall frame, such that there is a risk that the load falls from the wall frame. In addition, the loads may not be level with the floor if secured in such a manner.

Another way to secure a load to a wall frame is to use wall mounting systems, such as a French cleat. Existing wall mounting systems have a first counterpart that is secured to the wall frame, and a second counterpart that is complementary to the first counterpart that is secured to the load. The load is secured to the wall frame by engaging the first counterpart and the second counterpart. However, when the first counterpart and the second counterpart are engaged, at least a portion of the first counterpart experiences stresses in both a downward direction, due to gravity, and a direction away from the wall frame, due to the tendency of the load to displace away from the wall frame. This may lead to failure of the first counterpart, particularly at the portion that is experiencing stresses in multiple directions. Moreover, the wall itself may become warped. In addition, existing wall mounting systems may have a plurality of contact points or interfaces that support the load. By having a plurality of contact points or interfaces that support the load, misalignment of any one of these contact points or interfaces may affect leveling the load relative to the floor.

SUMMARY

In one aspect, there is provided a system for mounting a load to a wall frame, the system comprising: a first mounting system and a second mounting system, wherein: the first mounting system includes a wall bracket and a load bracket; the second mounting system includes a wall bracket and a load bracket; wherein: the wall bracket of the first mounting system includes: a mounting flange for mounting the wall bracket of the first mounting system to the wall frame; and a retaining flange; the load bracket of the first mounting system includes: a mounting flange for mounting the load bracket of the first mounting system to the load; a retainable flange; the wall bracket of the second mounting system includes: a mounting flange for mounting the wall bracket of the second mounting system to the wall frame; a retaining flange; and a ledge configured to vertically support the load; the load bracket of the second mounting system includes: a mounting flange for mounting the load bracket of the second mounting system to the load; and a retainable flange; wherein the wall bracket and the load bracket of the first mounting system and the wall bracket and the load bracket of the second mounting system are co-operatively configured, and the wall bracket of the first mounting system, the load bracket of the first mounting system, the wall bracket of the second mounting system, the load bracket of the second mounting system, the mountability of the wall bracket, of the first mounting system, to the wall frame, the mountability of the load bracket, of the first mounting system, to the load, the mountability of the wall bracket, of the second mounting system, to the wall frame, and the mountability of the load bracket, of the second mounting system, to the load are co-operatively configured, such that: a first receiving space is defined between the wall frame and the retaining flange of the wall bracket of the first mounting system; the retainable flange of the load bracket of the first mounting system is receivable within the first receiving space; a second receiving space is defined between the wall frame and the retaining flange of the wall bracket of the second mounting system; the retainable flange of the load bracket of the second mounting system is receivable within the second receiving space; and the ledge is disposed for vertically supporting the load while: (i) the retainable flange of the load bracket of the first mounting system is disposed within the first receiving space, and (ii) the retainable flange of the load bracket of the second mounting system is disposed within the second receiving space, such that the load is mounted to the wall frame via the first and second mounting systems.

In another aspect, there is provided a wall panel, comprising: a glass panel, including: a front surface; a rear surface that is disposed on an opposite side of the panel relative to the front surface; wherein the front surface is connected to the rear surface by a side surface; and a cushioning member overlaying at least a portion of the side surface, such that at least a portion of a wall panel side surface is defined by the cushioning member; wherein the wall panel side surface portion is configured for becoming disposed in abutting engagement with a side surface portion of another wall panel.

In another aspect, there is provided a kit for assembling a wall between a first corner and a second corner of a room, wherein the first corner is horizontally spaced from the second corner by a first distance, the kit comprising: a plurality of wall panels that are configured to be mounted in end-to-end configuration between the first and second corners, such that a plurality of mounted walls panels are obtained; and a corner bracket; wherein: the wall panels and the corner bracket are co-operatively configured such that, while: (i) the wall panels are mounted in the end-to-end configuration, starting from the first corner and extending towards the second corner, such that a gap is defined between the last one of the wall panels and the second corner, and (ii) the corner bracket is mounted at the second corner, the corner bracket extends from the second corner such that the walls panels are disposed in overlapping relationship with the corner bracket, and such that the gap is concealed by the corner bracket.

In another aspect, there is provided a wall system comprising: a wall frame; at least one panel, wherein each one of the at least one panel, independently, includes; a front surface; a rear surface disposed on an opposite side of the panel relative to the front surface; an upper panel bracket including: a mounting flange, secured to the rear surface, with effect that the upper panel bracket is mounted to the panel; and a retainable flange; and a lower panel bracket including: a mounting flange, secured to the rear surface, with effect that the lower panel bracket is mounted to the panel below the upper panel bracket; and a retainable flange; an upper wall bracket including: a mounting flange, secured to the wall frame, with effect that the upper wall bracket is mounted to the wall frame; and a retaining flange; a lower wall bracket including: a mounting flange, secured to the wall frame, with effect that the lower wall bracket is mounted to the wall frame vertically below the upper wall bracket; a retaining flange; and a ledge wherein: the mounting of the upper wall bracket to the wall frame is with effect that an upper receiving space is defined between the wall frame and the retaining flange of the upper wall bracket the mounting of the lower wall bracket to the wall frame is with effect that an lower receiving space is defined between the wall frame and the retaining flange of the lower wall bracket; for each one of the at least one panel, independently, the retainable flange of the upper panel bracket is disposed within the upper receiving space; for each one of the at least one panel, independently, the retainable flange of the lower panel bracket is disposed within the lower receiving space; and for each one of the at least one panel, the panel is vertically supported by the ledge.

In another aspect, there is provided a wall system comprising: a wall frame; at least one panel, each one of the at least one panel, independently, includes; a front surface; a rear surface disposed on an opposite side of the panel relative to the front surface; a panel bracket including: a mounting flange, secured to the rear surface, with effect that the panel bracket is mounted to the panel; and a retainable flange; a wall bracket including: a mounting flange, secured to the wall frame, with effect that the wall bracket is mounted to the wall frame; a retaining flange; and a ledge; wherein: the mounting of the wall bracket to the wall frame is with effect that a receiving space is defined between the wall frame and the retaining flange of the wall bracket; for each one of the at least one panel, independently, the retainable flange of the panel bracket is disposed within the receiving space; and the at least one panel is vertically supported by the ledge.

In another aspect, there is provided a mounting system for mounting a load to a wall frame, comprising: a wall bracket including: a mounting flange for mounting the load bracket to the wall frame; a retaining flange; and a ledge; a panel bracket including: a mounting flange for mounting the panel bracket to the panel; and a retainable flange; wherein: the wall bracket, the load bracket, the mountability of the wall bracket to the wall frame, and the mountability of the panel bracket to the panel are co-operatively configured, such that: a receiving space is defined between the wall frame and the retaining flange of the wall bracket; the retainable flange of the load bracket is receivable within the receiving space; and the ledge is disposed for vertically supporting the panel while the retainable flange of the load bracket is disposed within the receiving space, such that the load is mounted to the wall frame via the mounting system.

Other aspects will be apparent from the description and drawings provided herein.

BRIEF DESCRIPTION OF DRAWINGS

In the figures, which illustrate example embodiments.

DETAILED DESCRIPTION

A system for mounting a load to a wall frame is disclosed. The system has an upper mounting system and a lower mounting system. Each of the upper and lower mounting systems has a wall bracket and a load bracket. The wall brackets of the upper and lower mounting systems each include a retaining flange, and are configured to be mounted to the wall frame. While the wall brackets of the upper and lower mounting systems are configured to be mounted to the wall frame, a receiving space is defined between the wall frame and the retaining flange. The wall bracket of the lower mounting system includes a ledge that is configured to vertically support the load. The load brackets of the upper and lower mounting systems each include a retainable flange, and are configured to be mounted to the load. While the wall bracket of the upper mounting system and the wall bracket of the lower mounting system are mounted to the wall frame, and the load bracket of the upper mounting system and the load bracket of the lower mounting system are mounted to the load, and the retainable flange of the load bracket of the upper mounting system is received in the receiving space defined by the wall bracket of the upper mounting system, and the retainable flange of the load bracket of the lower mounting system is received in the receiving space defined by the wall bracket of the lower mounting system, displacement of the load away from the wall frame is resisted, and the load is vertically supported by the ledge of the wall bracket of the lower mounting system.

Figure 1:
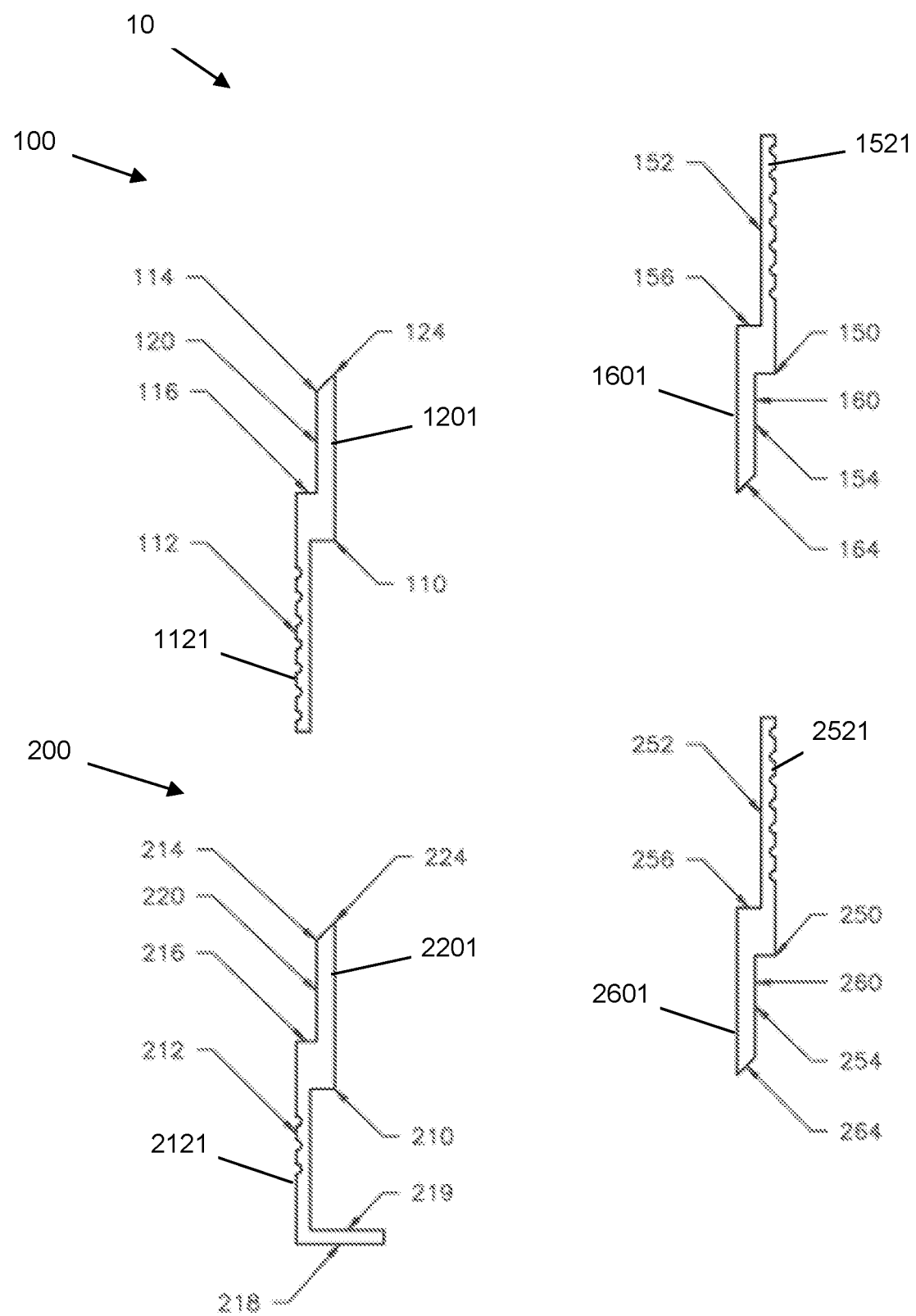
FIG. 1 is a cross-sectional view of an embodiment of a system for mounting a load to a wall frame.

FIG. 1 depicts a system 10 for mounting a load 30 to a supporting member 20, such as a wall frame 20 or studs 20. In some embodiments, for example, the load 30 is a glass panel, a wall panel, a shelf, a cabinet, a frame, a composite panel comprising, for example, a glass panel and a reinforcing substrate, and the like. As depicted in FIG. 1, the system 10 includes a first mounting system 100 and a second mounting system 200. The first mounting system 100 includes a first counterpart 110, for example, a wall bracket 110, and a second counterpart 150, for example, a load bracket 150. Similarly, the second mounting system 200 includes a first counterpart 210, for example, a wall bracket 210, and a second counterpart 250, for example, a load bracket 250.

Figure 2:
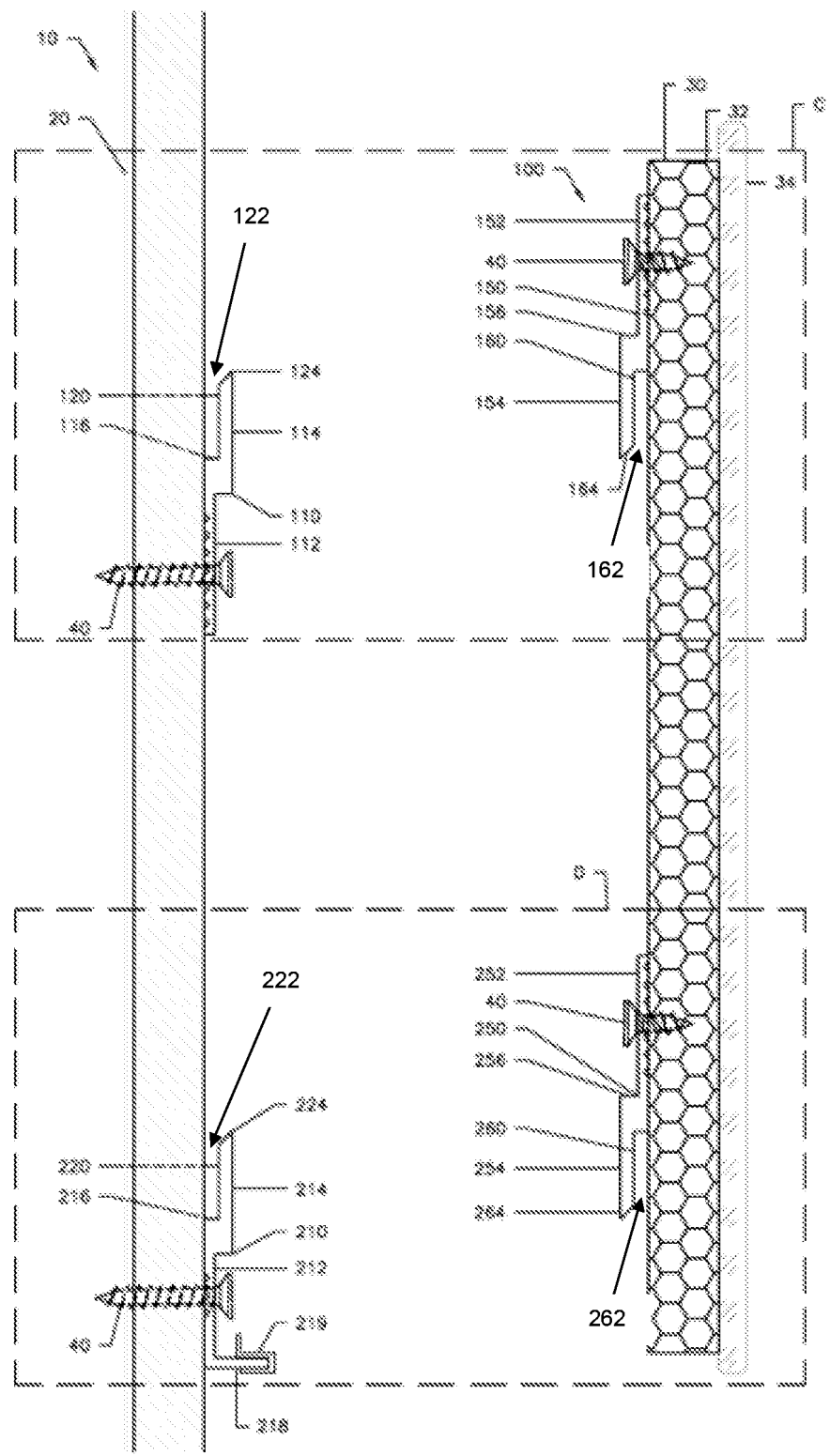
FIG. 2 is a cross-sectional view of the system of FIG. 1, with wall brackets mounted to the wall frame, and load brackets mounted to the load.
Figure 3:
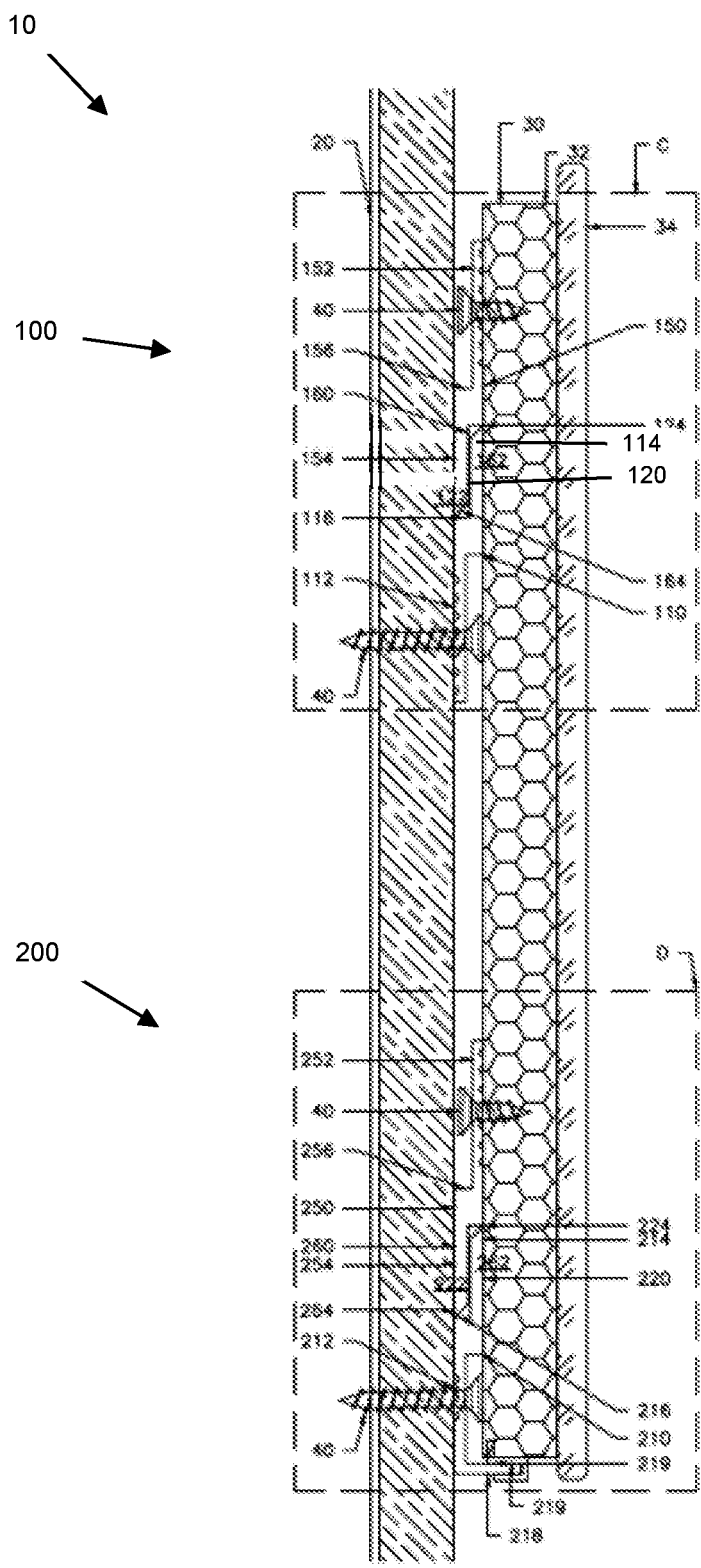
FIG. 3 is a cross-sectional view of the system of FIG. 1 that is mounting a load to a wall frame.

In some embodiments, for example, the wall bracket 110 of the first mounting system 100 is configured to be mounted to the wall frame 20. In this regard, the wall bracket 110 of the first mounting system 100 has a mounting flange 112 for mounting the wall bracket 110 of the first mounting system 100 to the wall frame 20. In some embodiments, for example, the mounting flange 112 is configured to correspond to the surface of the wall frame 20 to facilitate mounting of the wall bracket 110 of the first mounting system 100 to the wall frame 20. As depicted in FIG. 2 and FIG. 3, when the mounting flange 112 is placed on the surface of the wall frame 20, the mounting flange 112 is parallel relative to the surface of the wall frame 20, such that the wall bracket 110 of the first mounting system 100 may be mounted to the wall frame 20. In some embodiments, for example, when the mounting flange 112 is placed on the surface of the wall frame 20, the mounting flange 112 is flush against the surface of the wall frame 20. In some embodiments, for example, the wall bracket 110 of the first mounting system 100 is mounted to the wall frame 20 using fastening devices 40 such as nuts and bolts, screws, rivets, pins, studs, washers, and the like, or adhesives, tape, welding, and the like. In some embodiments, for example, where the wall bracket 110 of the first mounting system 100 is mounted to the wall frame 20 using fastening devices 40, the mounting flange 112 defines one or more ports to receive the fastening devices 40 to mount the wall bracket 110 of the first mounting system 100 is mounted to the wall frame 20.

In some embodiments, for example, the mounting flange 112 of the wall bracket 110 of the first mounting system 100 includes a wall-abutting surface 1121 configured for disposition in an abutting relationship relative to the wall frame 20 to which mounting flange 112 is mountable.

In some embodiments, for example, the wall bracket 110 of the first mounting system 100 includes a retaining flange 114 that is connected to the mounting flange 112. The retaining flange 114 defines a retaining surface 120, and is configured to resist displacement of the load 30 from the wall frame 20, as described in greater detail below. As depicted in FIG. 1, the retaining flange 114 is generally parallel to the mounting flange 112. In some embodiments, for example, the retaining flange 114 is angled relative to the mounting flange 112. That is, an angle is defined between an axis that extends along the height of the mounting flange 112 and an axis that extends along the height of the retaining flange 114.

In some embodiments, for example, the retaining flange 114 defines surfaces 120 and 1201, wherein the surfaces 120 and 1201 are disposed on opposite sides of the retaining flange 114. In some embodiments, for example, the surfaces 120 and 1201 define respective normal axes. In some embodiments, for example, while a wall panel 30 is mounted to the wall frame 20 via the mounting system 10, the axes of surfaces 120 and 1201 are parallel to the axis of the normal axis defined by the front surface of the wall panel 30.

While the wall bracket 110 of the first mounting system 100 is mounted to the wall frame 20, a receiving space 122 is defined between the wall frame 20 and the retaining flange 114, as depicted in FIG. 2. As depicted in FIG. 1, in some embodiments, for example, the wall bracket 110 of the first mounting system 100 includes a connecting member 116 that extends between the mounting flange 112 and the retaining flange 114. As depicted in FIG. 1, the connecting member 116 is generally perpendicular relative to the mounting flange 112 and the retaining flange 114. In some embodiments, for example, the connecting member 116 is angled relative to the mounting flange 112 and the retaining flange 114. In some embodiments, for example, the mounting flange 112, the retaining flange 114, and the connecting member 116 of the wall bracket 110 of the first mounting system 100 are co-operatively configured to define the receiving space 122 while the wall bracket 110 of the first mounting system 100 is mounted to the wall frame 20. In some embodiments, for example, the receiving space 122 is configured to receive the retainable flange 154 of the load bracket 150 of the first mounting system 100, as described in greater detail below. In some embodiments, for example, the length of the receiving space 122 is based on the length of the wall bracket 110 of the first mounting system 100, and the width of the receiving space 122 is based on the width of the connecting member 116.

In some embodiments, for example, the load bracket 150 of the first mounting system 100 is configured to be mounted to the load 30. In this regard, the load bracket 150 of the first mounting system 100 has a mounting flange 152 for mounting the load bracket 150 of the first mounting system 100 to the load 30. In some embodiments, for example, the mounting flange 152 is configured to correspond to the surface of the load 30 to facilitate mounting of the load bracket 150 of the first mounting system 100 to the load 30. As depicted in FIG. 2 and FIG. 3, when the load bracket 150 is placed on the surface of the load 30, the mounting flange 152 is parallel relative to the surface of the load 30, such that the load bracket 150 of the first mounting system 100 may be mounted to the load 30. In some embodiments, for example, when the mounting flange 152 is placed on the surface of the load 30, the mounting flange 152 is flush against the surface of the load 30. In some embodiments, for example, the load bracket 150 of the first mounting system 100 is mounted to the load 30 using fastening devices 40 such as nuts and bolts, screws, rivets, pins, studs, washers, and the like, or adhesives, tape, welding, and the like. In some embodiments, for example, where the load bracket 150 of the first mounting system 100 is mounted to the load 30 using fastening devices 40, the mounting flange 152 defines one or more ports to receive the fastening devices 40 to mount the load bracket 150 of the first mounting system 100 is mounted to the load 30.

In some embodiments, for example, the mounting flange 152 of the load bracket 150 of the first mounting system 100 includes a load-abutting surface 1521 configured for disposition in an abutting relationship relative to the load 30 to which mounting flange 152 is mountable.

In some embodiments, for example, the load bracket 150 of the first mounting system 100 includes a retainable flange 154 that is connected to the mounting flange 152. The retainable flange 154 defines a retainable surface 120, and is configured to resist displacement of the load 30 from the wall frame 20, as described in greater detail below. As depicted in FIG. 1, the retainable flange 154 is generally parallel to the mounting flange 152. In some embodiments, for example, the retainable flange 154 is angled relative to the mounting flange 152. That is, an angle is defined between an axis that extends along the height of the mounting flange 152 and an axis that extends along the height of the retainable flange 154.

In some embodiments, for example, the retainable flange 154 defines surfaces 160 and 1601, wherein the surfaces 160 and 1601 are disposed on opposite sides of the retaining flange 154. In some embodiments, for example, the surfaces 160 and 1601 define respective normal axes. In some embodiments, for example, while a wall panel 30 is mounted to the wall frame 20 via the mounting system 10, the axes of surfaces 160 and 1601 are parallel to the axis of the normal axis defined by the front surface of the wall panel 30.

While the load bracket 150 of the first mounting system 100 is mounted to the load 30, a receiving space 162 is defined between the load 30 and the retainable flange 154, as depicted in FIG. 2. As depicted in FIG. 1, in some embodiments, for example, the load bracket 150 of the first mounting system 100 includes a connecting member 156 that extends between the mounting flange 152 and the retainable flange 154. As depicted in FIG. 1, the connecting member 156 is generally perpendicular relative to the mounting flange 152 and the retainable flange 154. In some embodiments, for example, the connecting member 156 is angled relative to the mounting flange 152 and the retainable flange 154. In some embodiments, for example, the mounting flange 152, the retainable flange 154, and the connecting member 156 of the load bracket 150 of the first mounting system 100 are co-operatively configured to define the receiving space 162 while the load bracket 150 of the first mounting system 100 is mounted to the load 30. In some embodiments, for example, the receiving space 162 is configured to receive the retaining flange 114 of the wall bracket 110 of the first mounting system 100, as described in greater detail below. In some embodiments, for example, the length of the receiving space 162 is based on the length of the load bracket 150 of the first mounting system 100, and the width of the receiving space 162 is based on the width of the connecting member 156.

In some embodiments, for example, the wall bracket 210 of the second mounting system 200 is configured to be mounted to the wall frame 20, similar to the wall bracket 110 of the first mounting system 100. In this regard, the wall bracket 210 of the second mounting system 200 has a mounting flange 212 for mounting the wall bracket 210 of the second mounting system 200 to the wall frame 20. In some embodiments, for example, the mounting flange 212 is configured to correspond to the surface of the wall frame 20 to facilitate mounting of the wall bracket 210 of the second mounting system 200 to the wall frame 20. As depicted in FIG. 2 and FIG. 3, when the mounting flange 212 is placed on the surface of the wall frame 20, the mounting flange 212 is parallel against the surface of the wall frame 20, such that the wall bracket 210 of the second mounting system 200 may be mounted to the wall frame 20. In some embodiments, for example, when the mounting flange 212 is placed on the surface of the wall frame 20, the mounting flange 212 is flush against the surface of the wall frame 20. In some embodiments, for example, the wall bracket 210 of the second mounting system 200 is mounted to the wall frame 20 using fastening devices 40 such as nuts and bolts, screws, rivets, pins, studs, washers, and the like, or adhesives, tape, welding, and the like. In some embodiments, for example, where the wall bracket 210 of the second mounting system 200 is mounted to the wall frame 20 using fastening devices 40, the mounting flange 212 defines one or more ports to receive the fastening devices 40 to mount the wall bracket 210 of the second mounting system 200 is mounted to the wall frame 20.

In some embodiments, for example, the mounting flange 212 of the wall bracket 210 of the second mounting system 200 includes a load-abutting surface 2121 configured for disposition in an abutting relationship relative to the wall frame 20 to which mounting flange 212 is mountable.

In some embodiments, for example, the wall bracket 210 of the second mounting system 200 includes a retaining flange 214 that is connected to the mounting flange 212. The retaining flange 214 defines a retaining surface 220, and is configured to resist displacement of the load 30 from the wall frame 20, as described in greater detail below. As depicted in FIG. 1, the retaining flange 214 is generally parallel to the mounting flange 212. In some embodiments, for example, the retaining flange 214 is angled relative to the mounting flange 212. That is, an angle is defined between an axis that extends along the height of the mounting flange 212 and an axis that extends along the height of the retaining flange 214.

In some embodiments, for example, the retaining flange 214 defines surfaces 220 and 2201, wherein the surfaces 220 and 2201 are disposed on opposite sides of the retaining flange 214. In some embodiments, for example, the surfaces 220 and 2201 define respective normal axes. In some embodiments, for example, while a wall panel 30 is mounted to the wall frame 20 via the mounting system 10, the axes of surfaces 220 and 2201 are parallel to the axis of the normal axis defined by the front surface of the wall panel 30.

While the wall bracket 210 of the second mounting system 200 is mounted to the wall frame 20, a receiving space 222 is defined between the wall frame 20 and the retaining flange 114, as depicted in FIG. 2. As depicted in FIG. 1, in some embodiments, for example, the wall bracket 210 of the second mounting system 200 includes a connecting member 216 that extends between the mounting flange 212 and the retaining flange 214. As depicted in FIG. 1, the connecting member 216 is generally perpendicular relative to the mounting flange 212 and the retaining flange 214. In some embodiments, for example, the connecting member 216 is angled relative to the mounting flange 212 and the retaining flange 214. In some embodiments, for example, the mounting flange 212, the retaining flange 214, and the connecting member 216 of the wall bracket 210 of the second mounting system 200 are co-operatively configured to define the receiving space 222 while the wall bracket 210 of the second mounting system 200 is mounted to the wall frame 20. In some embodiments, for example, the receiving space 222 is configured to receive the retainable flange 254 of the load bracket 250 of the first mounting system 100, as described in greater detail below. In some embodiments, for example, the length of the receiving space 222 is based on the length of the wall bracket 210 of the second mounting system 200, and the width of the receiving space 222 is based on the width of the connecting member 216.

The wall bracket 210 of the second mounting system 200 includes a ledge 218, for example, a shoulder, that is configured to support the load 30. The ledge 218 defines a support surface 219 for effecting the vertical support of the load 30. In some embodiments, for example, the load 30 rests on the ledge 218 while the ledge 218 is supporting the load 30. In some embodiments, for example, when the wall bracket 210 of the second mounting system 200 is mounted to the wall frame 20, the ledge 218 is level with the floor, such that when the load 30 is supported by the ledge 218, the load 30 is level with the floor. As depicted in FIG. 1, in some embodiments, for example, the ledge 218 extends from the mounting flange 212, and extends sufficiently from the mounting flange 212 to support the load 30. In some embodiments, for example, the ledge 218 extends perpendicularly from the mounting flange 212. In such embodiments, where the mounting flange 212 is mounted flush or parallel with the surface of the wall frame 20, the ledge 218 is perpendicular to the surface of the wall frame 20 on which the wall bracket 210 of the second mounting system 200 is mounted. As depicted in FIG. 1, the ledge 218 is offset from the connecting member 216 of the wall bracket 210 of the second mounting system 200.

Figure 5:
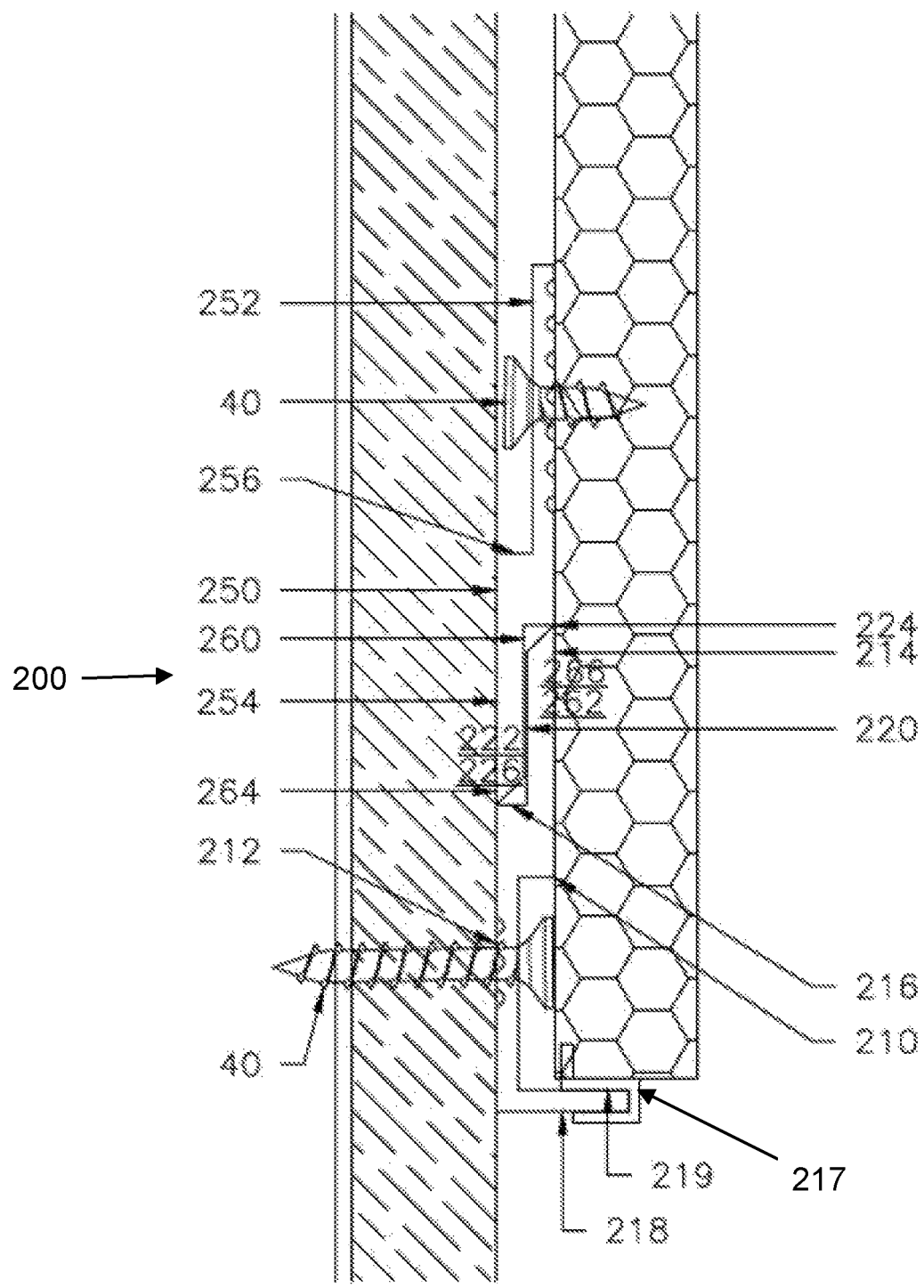
FIG. 5 is an enlarged view of the portion of the system of FIG. 3, the portion identified by window D shown in FIG. 3.

In some embodiments, for example, a protective member 217 is disposed on the ledge 218. In some embodiments, for example, the protective member 217 is disposed on the surface 219. As depicted in FIG. 5, while the load 30 is supported by the ledge 218, the protective member 217 is disposed between the ledge 218 and the load 30 to reduce damage to the ledge 218 and the load 30, for example, due to wear and tear or friction between the ledge 218 and the load 30. In some embodiments, for example, the protective member 217 is a gasket, a seal, or a rubber sealant, such as a silicone rubber sealant.

In some embodiments, for example, the support surface 219 has a normal axis that is perpendicular to the normal axis of the wall-abutting surface 2121 of the mounting flange 212 of the wall bracket 210 of the second mounting system 200.

In some embodiments, for example, the load bracket 250 of the second mounting system 200 is configured to be mounted to the load 30. In this regard, the load bracket 250 of the second mounting system 200 has a mounting flange 252 for mounting the load bracket 250 of the second mounting system 200 to the load 30. In some embodiments, for example, the mounting flange 252 is configured to correspond to the surface of the load 30 to facilitate mounting of the load bracket 250 of the second mounting system 200 to the load 30. As depicted in FIG. 2 and FIG. 3, when the load bracket 250 is placed on the surface of the load 30, the mounting flange 252 is parallel relative to the surface of the load 30, such that the load bracket 250 of the second mounting system 200 may be mounted to the load 30. In some embodiments, for example, when the mounting flange 252 is placed on the surface of the load 30, the mounting flange 252 is flush against the surface of the load 30. In some embodiments, for example, the load bracket 250 of the second mounting system 200 is mounted to the load 30 using fastening devices 40 such as nuts and bolts, screws, rivets, pins, studs, washers, and the like, or adhesives, tape, welding, and the like. In some embodiments, for example, where the load bracket 250 of the second mounting system 200 is mounted to the load 30 using fastening devices 40, the mounting flange 252 defines one or more ports to receive the fastening devices 40 to mount the load bracket 250 of the second mounting system 200 is mounted to the load 30.

In some embodiments, for example, the mounting flange 252 of the load bracket 250 of the second mounting system 200 includes a load-abutting surface 2521 configured for disposition in an abutting relationship relative to the load 30 to which mounting flange 252 is mountable.

In some embodiments, for example, the load bracket 250 of the second mounting system 200 includes a retainable flange 254 that is connected to the mounting flange 252. The retainable flange 254 defines a retainable surface 260, and is configured to resist displacement of the load 30 from the wall frame 20, as described in greater detail below. As depicted in FIG. 1, the retainable flange 254 is generally parallel to the mounting flange 252. In some embodiments, for example, the retainable flange 254 is angled relative to the mounting flange 252. That is, an angle is defined between an axis that extends along the height of the mounting flange 252 and an axis that extends along the height of the retainable flange 254.

In some embodiments, for example, the retainable flange 254 defines surfaces 260 and 2601, wherein the surfaces 260 and 2601 are disposed on opposite sides of the retaining flange 254. In some embodiments, for example, the surfaces 260 and 2601 define respective normal axes. In some embodiments, for example, while a wall panel 30 is mounted to the wall frame 20 via the mounting system 10, the axes of surfaces 260 and 2601 are parallel to the axis of the normal axis defined by the front surface of the wall panel 30.

While the load bracket 250 of the second mounting system 200 is mounted to the load 30, a receiving space 262 is defined between the load 30 and the retainable flange 254, as depicted in FIG. 2. As depicted in FIG. 1, in some embodiments, for example, the load bracket 250 of the second mounting system 200 includes a connecting member 256 that extends between the mounting flange 252 and the retainable flange 254. As depicted in FIG. 1, the connecting member 256 is generally perpendicular relative to the mounting flange 252 and the retainable flange 254. In some embodiments, for example, the connecting member 256 is angled relative to the mounting flange 252 and the retainable flange 254. In some embodiments, for example, the mounting flange 252, the retainable flange 254, and the connecting member 256 of the load bracket 250 of the second mounting system 200 are co-operatively configured to define the receiving space 262 while the load bracket 250 of the second mounting system 200 is mounted to the load 30. In some embodiments, for example, the receiving space 262 is configured to receive the retaining flange 214 of the wall bracket 210 of the second mounting system 200, as described in greater detail below. In some embodiments, for example, the length of the receiving space 262 is based on the length of the load bracket 250 of the second mounting system 200, and the width of the receiving space 262 is based on the width of the connecting member 256.

FIG. 3 depicts the system 10 securing the load 30 to the wall, with the wall bracket 110 of the first mounting system 100 engaged with the load bracket 150 of the first mounting system 100, and the wall bracket 210 of the second mounting system 200 engaged with the load bracket 250 of the second mounting system 200. As depicted in FIG. 3, the load 30, or a portion of the load 30, is resting on the surface 219 of the ledge 218 and supported by the ledge 218 while the load 30 is secured to the wall frame 20.

As depicted in FIG. 2 and FIG. 3, the wall bracket 110 of the first mounting system 100 and the wall bracket 210 of the second mounting system 200 are mounted to the wall frame 20 using fasteners 40, and the load bracket 150 of the first mounting system 100 and the load bracket 250 of the second mounting system 200 are mounted to the load 30 using fasteners. In addition, the retainable flange 154 of the load bracket 150 of the first mounting system 100 is received in the receiving space 122 defined by the wall bracket 110 of the first mounting system 100, and the retainable flange 254 of the load bracket 250 of the second mounting system 200 is received in the receiving space 222 defined by the wall bracket 110 of the second mounting system 200.

In some embodiments, for example, the first mounting system 100 and the second mounting system 200 are co-operatively configured such that, while the wall bracket 110 of the first mounting system 100 and the wall bracket 210 of the second mounting system 200 are mounted to the wall frame 20, and the load bracket 150 of the first mounting system 100 and the load bracket 250 of the second mounting system 200 are mounted to the load 30, and the retainable flange 154 of the load bracket 150 of the first mounting system 100 is received in the receiving space 122 defined by the wall bracket 110 of the first mounting system 100, and the retainable flange 254 of the load bracket 250 of the second mounting system 200 is received in the receiving space 222 defined by the wall bracket 210 of the second mounting system 200, the load 30 is supported by the ledge 218 of the wall bracket 210 of the second mounting system 200.

In some embodiments, for example, the first mounting system 100 and the second mounting system 200 are co-operatively configured such that while the load bracket 150 of the first mounting system 100 is mounted to the load 30, and the retainable flange 154 of the load bracket 150 of the first mounting system 100 is received in the receiving space 122 defined by the wall bracket 110 of the first mounting system 100 while the wall bracket 110 of the first mounting system 100 is mounted to the wall frame 20, displacement of the load 30 away from the wall frame 20 is resisted. In some embodiments, for example, the displacement of the load 30 away from the wall frame 20 is resisted upon engagement of the retaining surface 120 of the retaining flange 114 of the wall bracket 110 of the first mounting system 100 and the retainable surface 120 of the retainable flange 154 of the load bracket 150 of the first mounting system 100. In some embodiments, for example, the displacement of the load 30 away from the wall frame 20 is resisted while the load 30 is supported by the ledge 218.

In some embodiments, for example, the first mounting system 100 and the second mounting system 200 are co-operatively configured such that while the load bracket 250 of the second mounting system 200 is mounted to the load 30, and the retainable flange 254 of the load bracket 250 of the second mounting system 200 is received in the receiving space 222 defined by the wall bracket 210 of the second mounting system 200 while the wall bracket 210 of the second mounting system 200 is mounted to the wall frame 20, displacement of the load 30 away from the wall frame 20 is resisted. In some embodiments, for example, the displacement of the load 30 away from the wall frame 20 is resisted upon engagement of the retaining surface 220 of the retaining flange 214 of the wall bracket 210 of the second mounting system 200 and the retainable surface 260 of the retainable flange 254 of the load bracket 250 of the second mounting system 200. In some embodiments, for example, the displacement of the load 30 away from the wall frame 20 is resisted while the load 30 is supported by the ledge 218.

Figure 4:
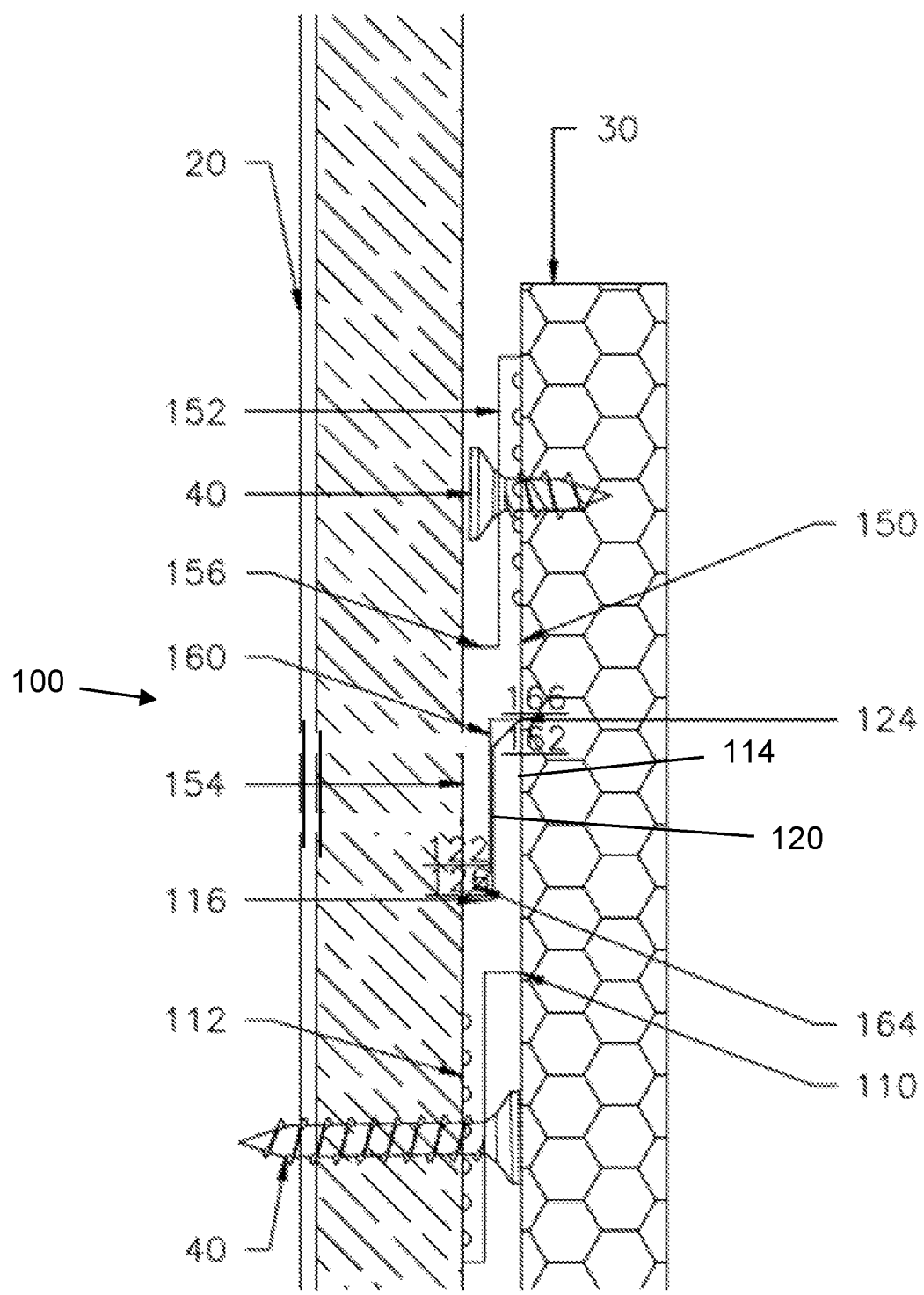
FIG. 4 is an enlarged view of the portion of the system of FIG. 3, the portion identified by window C shown in FIG. 3.

In some embodiments, for example, the first mounting system 100 and the second mounting system 200 are co-operatively configured such that while the load bracket 150 of the first mounting system 100 is mounted to the load 30, and the retainable flange 154 of the load bracket 150 of the first mounting system 100 is received in the receiving space 122 defined by the wall bracket 110 of the first mounting system 100 while the wall bracket 110 of the first mounting system 100 is mounted to the wall frame 20, the retaining surface 120 of the retaining flange 114 of the wall bracket 110 of the first mounting system 100 opposes the retainable surface 120 of the retainable flange 154 of the load bracket 150 of the first mounting system 100, as depicted in FIG. 3 and FIG. 4. In some embodiments, for example, the retaining surface 120 of the retaining flange 114 of the wall bracket 110 of the first mounting system 100 opposes the retainable surface 120 of the retainable flange 154 of the load bracket 150 of the first mounting system 100 while the load 30 is supported by the ledge 218.

In some embodiments, for example, the first mounting system 100 and the second mounting system 200 are co-operatively configured such that while the load bracket 250 of the second mounting system 200 is mounted to the load 30, and the retainable flange 254 of the load bracket 250 of the second mounting system 200 is received in the receiving space 222 defined by the wall bracket 210 of the second mounting system 200 while the wall bracket 210 of the second mounting system 200 is mounted to the wall frame 20, the retaining surface 220 of the retaining flange 214 of the wall bracket 210 of the second mounting system 200 opposes the retainable surface 260 of the retainable flange 254 of the load bracket 250 of the second mounting system 200, as depicted in FIG. 3 and FIG. 5. In some embodiments, for example, the retaining surface 220 of the retaining flange 214 of the wall bracket 210 of the second mounting system 200 opposes the retainable surface 260 of the retainable flange 254 of the load bracket 250 of the second mounting system 200 while the load 30 is supported by the ledge 218.

As depicted in FIG. 2, FIG. 3, and FIG. 4, in some embodiments, for example, the receiving space 162 is defined by the load bracket 150 of the first mounting system 100 when the load bracket 150 is mounted to the load 30. In some embodiments, for example, the first mounting system 100 and the second mounting system 200 are co-operatively configured such that while the wall bracket 110 of the first mounting system 100 is mounted to the wall frame 20, and the load bracket 150 of the first mounting system 100 is mounted to the load 30, and the retainable flange 154 of the load bracket 150 of the first mounting system 100 is received in the receiving space 122 defined by the wall bracket 110 of the first mounting system 100, the retaining flange 114 of the wall bracket 110 of the first mounting system 100 is received in the receiving space 162 defined by the load bracket 150 of the first mounting system 100.

As depicted in FIG. 2, FIG. 3, and FIG. 5, in some embodiments, for example, the receiving space 262 is defined by the load bracket 250 of the second mounting system 200 when the load bracket 250 is mounted to the load 30. In some embodiments, for example, the first mounting system 100 and the second mounting system 200 are co-operatively configured such that while the wall bracket 210 of the second mounting system 200 is mounted to the wall frame 20, and the load bracket 250 of the second mounting system 200 is mounted to the load 30, and the retainable flange 254 of the load bracket 250 of the second mounting system 200 is received in the receiving space 222 defined by the wall bracket 210 of the second mounting system 200, the retaining flange 214 of the second counterpart 210 of the second mounting system 200 is received in the receiving space 262 defined by the load bracket 250 of the second mounting system 200.

In some embodiments, for example, the retainable flange 154 is loosely received in the receiving space 122 defined by the wall bracket 110 of the first mounting system 100 when the wall bracket 110 of the first mounting system 100 is mounted to the wall frame 20. In some embodiments, for example, the wall bracket 110 and the load bracket 150 of the first mounting system 100 have a friction-fit or interference-fit engagement when the retainable flange 154 is received in the receiving space 122.

In some embodiments, for example, the retainable flange 254 is loosely received in the receiving space 222 defined by the wall bracket 210 of the second mounting system 200 when the wall bracket 210 of the second mounting system 200 is mounted to the wall frame 20. In some embodiments, for example, the wall bracket 210 and the load bracket 250 of the second mounting system 200 have a friction-fit or interference-fit engagement when the retainable flange 254 is received in the receiving space 222.

In some embodiments, for example, where the retaining flange 114 is received in the receiving space 162, the retaining flange 114 is loosely received in the receiving space 162 defined by the load bracket 150 of the first mounting system 100 when the load bracket 150 of the first mounting system 100 is mounted to the load 30. In some embodiments, for example, the wall bracket 110 and the load bracket 150 of the first mounting system 100 have a friction-fit or interference-fit engagement when the retaining flange 114 is received in the receiving space 162.

In some embodiments, for example, where the retaining flange 214 is received in the receiving space 262, the retaining flange 214 is loosely received in the receiving space 262 defined by the load bracket 250 of the second mounting system 200 when the load bracket 250 of the second mounting system 200 is mounted to the load 30. In some embodiments, for example, the wall bracket 210 and the load bracket 250 of the second mounting system 200 have a friction-fit or interference-fit engagement when the retaining flange 214 is received in the receiving space 262.

As depicted in FIG. 2, FIG. 3, and FIG. 4, in some embodiments, for example, the first mounting system 100 and the second mounting system 200 are co-operatively configured such that while the wall bracket 110 of the first mounting system 100 is mounted to the wall frame 20, and the load bracket 150 of the first mounting system 100 is mounted to the load 30, and the retainable flange 154 of the load bracket 150 of the first mounting system 100 is received in the receiving space 122 defined by the wall bracket 110 of the first mounting system 100, a space 126 is defined between a lower end surface 164 of the retainable flange 154 of the load bracket 150 of the first mounting system 100 and the connecting member 116 of the wall bracket 110 of the first mounting system 100. In some embodiments, for example, the space 126 is defined between the lower end surface 164 of the retainable flange 154 of the load bracket 150 of the first mounting system 100 and the connecting member 116 of the wall bracket 110 of the first mounting system 100 while the load 30 is supported by the ledge 218.

As depicted in FIG. 2, FIG. 3, and FIG. 5, in some embodiments, for example, the first mounting system 100 and the second mounting system 200 are co-operatively configured such that while the wall bracket 210 of the second mounting system 200 is mounted to the wall frame 20, and the load bracket 250 of the second mounting system 200 is mounted to the load 30, and the retainable flange 254 of the load bracket 250 of the second mounting system 200 is received in the receiving space 222 defined by the wall bracket 210 of the second mounting system 200, a space 226 is defined between a lower end surface 264 of the retainable flange 254 of the load bracket 250 of the second mounting system 200 and the connecting member 216 of the wall bracket 210 of the second mounting system 200. In some embodiments, for example, the space 226 is defined between the lower end surface 264 of the retainable flange 254 of the load bracket 250 of the second mounting system 200 and the connecting member 216 of the wall bracket 210 of the second mounting system 200 while the load 30 is supported by the ledge 218.

As depicted in FIG. 2, FIG. 3, and FIG. 4, in some embodiments, for example, the first mounting system 100 and the second mounting system 200 are co-operatively configured such that while the wall bracket 110 of the first mounting system 100 is mounted to the wall frame 20, and the load bracket 150 of the first mounting system 100 is mounted to the load 30, and the retaining flange 114 of the wall bracket 110 of the first mounting system 100 is received in the receiving space 162 defined by the load bracket 150 of the first mounting system 100, a space 166 is defined between an upper end surface 124 of the retaining flange 114 of the wall bracket 110 of the first mounting system 100 and the connecting member 156 of the load bracket 150 of the first mounting system 100. In some embodiments, for example, the space 166 is defined between the upper end surface 124 of the retaining flange 114 of the wall bracket 110 of the first mounting system 100 and the connecting member 156 of the load bracket 150 of the first mounting system 100 while the load 30 is supported by the ledge 218.

As depicted in FIG. 2, FIG. 3, and FIG. 5, in some embodiments, for example, the first mounting system 100 and the second mounting system 200 are co-operatively configured such that while the wall bracket 210 of the second mounting system 200 is mounted to the wall frame 20, and the load bracket 250 of the second mounting system 200 is mounted to the load 30, and the retaining flange 214 of the wall bracket 210 of the second mounting system 200 is received in the receiving space 262 defined by the load bracket 250 of the second mounting system 200, a space 266 is defined between an upper end surface 224 of the retaining flange 214 of the wall bracket 210 of the second mounting system 200 and the connecting member 256 of the load bracket 250 of the second mounting system 200. In some embodiments, for example, the space 266 is defined between the upper end surface 224 of the retaining flange 214 of the wall bracket 210 of the second mounting system 200 and the connecting member 256 of the load bracket 250 of the second mounting system 200 while the load 30 is supported by the ledge 218.

In some embodiments, for example, while the load 30 is secured to the wall frame 20 using the system 10, the weight of the load 30 is substantially supported by ledge 218, while the weight of the load 30 is not supported by the retaining flange 114 of the wall bracket 110 of the first mounting system 100 and the support flange 214 of the wall bracket 210 of the second mounting system 200. In some embodiments, for example, the retaining flanges 114 and 214 only support the load 30 to resist displacement of load 30 away from the wall frame 20.

In some embodiments, for example, the wall bracket 110 and the load bracket 150 of the first mounting system 100 and the wall bracket 210 and the load bracket 250 of the second mounting system 200 are co-operatively configured, and the wall bracket 110 of the first mounting system 100, the load bracket 150 of the first mounting system 100, the wall bracket 210 of the second mounting system 200, the load bracket 250 of the second mounting system 200, the mountability of the wall bracket 110, of the first mounting system 150, to the wall frame 20, the mountability of the load bracket 150, of the first mounting system 100, to the load 30, the mountability of the wall bracket 210, of the second mounting system 200, to the wall frame 20, and the mountability of the load bracket 250, of the second mounting system 200, to the load 30 are co-operatively configured, such that: (1) a first receiving space 122 is defined between the wall frame 20 and the retaining flange 114 of the wall bracket 110 of the first mounting system 100, (2) the retainable flange 152 of the load bracket 150 of the first mounting system 100 is receivable within the first receiving space 122, (3) a second receiving space 222 is defined between the wall frame 20 and the retaining flange 214 of the wall bracket 210 of the second mounting system 200, (4) the retainable flange 254 of the load bracket 250 of the second mounting system 200 is receivable within the second receiving space 222, (5) and the ledge 218 is disposed for vertically supporting the load 30 while: (i) the retainable flange 154 of the load bracket 150 of the first mounting system 100 is disposed within the first receiving space 122, and (ii) the retainable flange 254 of the load bracket 250 of the second mounting system 200 is disposed within the second receiving space 222, such that the load 30 is mounted to the wall frame 20 via the first and second mounting systems 100 and 200.

In some embodiments, for example, the wall bracket 110 of the first mounting system 100, the load bracket 150 of the first mounting system 100, the wall bracket 210 of the second mounting system 200, the load bracket 250 of the second mounting system 200, the mountability of the wall bracket 110, of the first mounting system 100, to the wall frame 20, the mountability of the load bracket 150, of the first mounting system 100, to the load 30, the mountability of the wall bracket 210, of the second mounting system 200, to the wall frame 20, and the mountability of the load bracket 250, of the second mounting system 200, to the load 30 are further co-operatively configured, such that, while the load 30 is mounted to the wall frame 20 via the first and second mounting system 100 and 200, the retaining flange 114 of the wall bracket 110 of the first mounting system 100 is disposed in opposition to displacement of the retainable flange 154 of the load bracket 150 of the first mounting system 100 away from the wall frame 20; and the retaining flange 214 of the wall bracket 210 of the second mounting system 200 is disposed in opposition to displacement of the retainable flange 254 of the load bracket 250 of the second mounting system 200 away from the wall frame 20, In some embodiments, for example, the wall bracket 110 of the first mounting system 100, the load bracket 150 of the first mounting system 100, the wall bracket 210 of the second mounting system 200, the load bracket 250 of the second mounting system 200, the mountability of the wall bracket 110, of the first mounting system 100, to the wall frame 20, the mountability of the load bracket 150, of the first mounting system 100, to the load 30, the mountability of the wall bracket 210, of the second mounting system 200, to the wall frame 20, and the mountability of the load bracket 250, of the second mounting system 200, to the load 30 are further co-operatively configured, such that, while the load 30 is mounted to the wall frame 20 via the first and second mounting system 100 and 200, the retaining flange 114 of the wall bracket 110 of the first mounting system 100 is opposing displacement of the retainable flange 154 of the load bracket 150 of the first mounting system 100 along an axis that is normal to a surface of the wall frame 20 to which the mounting flange 112 of the wall bracket 110 of the first mounting system 100 is mounted, and the retaining flange 214 of the wall bracket 210 of the second mounting system 200 is opposing displacement of the retainable flange 254 of the load bracket 250 of the second mounting system 200 along an axis that is normal to a surface of the wall frame 20 to which the mounting flange 212 of the wall bracket 210 of the second mounting system 200 is mounted.

In some embodiments, for example, the wall bracket 110 of the first mounting system 100, the load bracket 150 of the first mounting system 100, the wall bracket 210 of the second mounting system 200, the load bracket 250 of the second mounting system 200, the mountability of the wall bracket 110, of the first mounting system 100, to the wall frame 20, the mountability of the load bracket 150, of the first mounting system 100, to the load 30, the mountability of the wall bracket 210, of the second mounting system 200, to the wall frame 20, and the mountability of the load bracket 250, of the second mounting system 200, to the load 30 are further co-operatively configured, such that, while the load 30 is mounted to the wall frame 20 via the first and second mounting system 100 and 200, there is an absence of vertical support of the retainable flange 154 of the load bracket 150 of the first mounting system 100 by the wall bracket 110 of the first mounting system 100, and there is an absence of vertical support of the retainable flange 254 of the load bracket 250 of the second mounting system 200 by the wall bracket 210 of the second mounting system 200.

In some embodiments, for example, as depicted in FIG. 2 and FIG. 3, the first mounting system 100 is an upper mounting system for effecting mounting of an upper portion of the load 30 to the wall frame 20, and the second mounting system 200 is a lower mounting system for effecting mounting of a lower portion of the load 30 to the wall frame 20.

In some embodiments, for example, the mounting flange 152 of the load bracket 150 of the first mounting system 100 is mountable to an upper portion of the load 30, and the mounting flange 252 of the load bracket 250 of the second mounting system 200 is mountable to a lower portion of the load 30.

In some embodiments, for example, as depicted in FIG. 2 and FIG. 3 while the wall bracket 110 is mounted to the wall frame 20, the mounting flange 112 and the retaining flange 114 are extending vertically, and the surfaces 1121, 120, and 1201 define normal axes that extend horizontally.

In some embodiments, for example, while the load bracket 150 is mounted to the load 30 and the load 30 is mounted to the wall frame 20 via the mounting system 10, the mounting flange 152 and the retainable flange 154 are extending vertically, and the surfaces 1521, 160, and 1601 define normal axes that extend horizontally.

In some embodiments, for example, while the wall bracket 210 is mounted to the wall frame 20, the mounting flange 212 and the retaining flange 214 are extending vertically, and the surfaces 2121, 220, and 2201 define normal axes that extend horizontally.

In some embodiments, for example, while the load bracket 250 is mounted to the load 30 and the load 30 is mounted to the wall frame 20 via the mounting system 10, the mounting flange 252 and the retainable flange 254 are extending vertically, and the surfaces 2521, 260, and 2601 define normal axes that extend horizontally.

FIGS. 5 to 9 depict the securing of a load 30, in particular a glass panel 34, to a stud 20 using the system 10.

Figure 13:
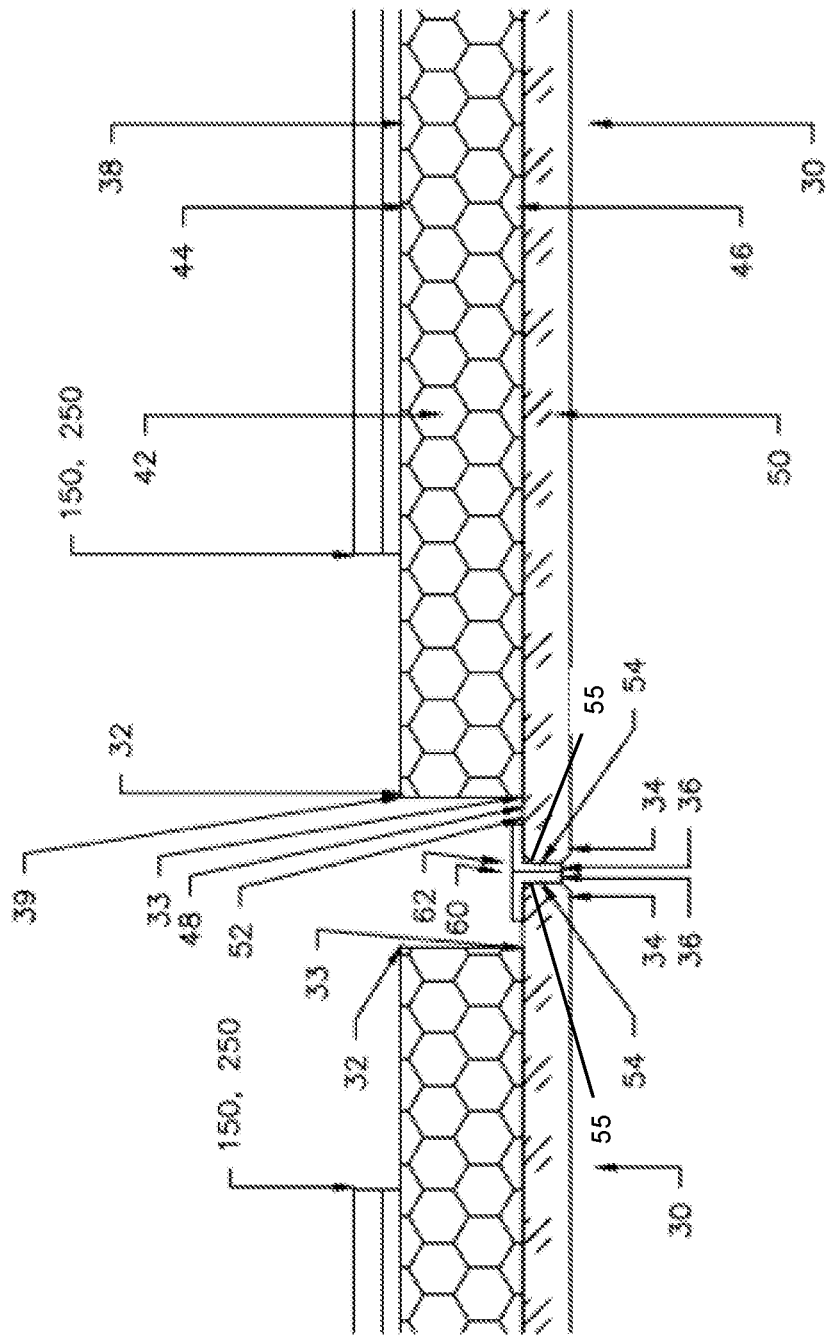
FIG. 13 is a side view of two wall panels with respective cushioning members disposed in abutting engagement.

In some embodiments, for example, as depicted in FIG. 2, FIG. 3, FIG. 8, FIG. 10, FIG. 15, and FIG. 16, the load 30 is a wall panel 30 that is configured to assemble a wall when one more wall panels are mounted to studs 20. As depicted, the load 30, for example, the wall panel 30, includes a reinforcing substrate 32 and a glass panel 34 that is connected to the reinforcing substrate 32. In some embodiments, for example, the reinforcing substrate 32 and the glass panel 34 are connected using an adhesive 33, such as a pressure-sensitive adhesive. In some embodiments, for example, the reinforcing substrate 32 has a body 38 with a rear surface 44 and a front surface 46 that is disposed on an opposite side of the reinforcing substrate 32 relative to the surface 44. In some embodiments, for example, the glass panel 34 has a rear surface 48 and a front surface 50 that is disposed on an opposite side of the panel 34 relative to the surface 48. As depicted in FIG. 13, the reinforcing substrate 32 and the glass panel 34 are connected together by connecting the surface 46 of the reinforcing substrate 32 and the surface 48 of the glass panel 34 using the adhesive 33.

Figure 11:
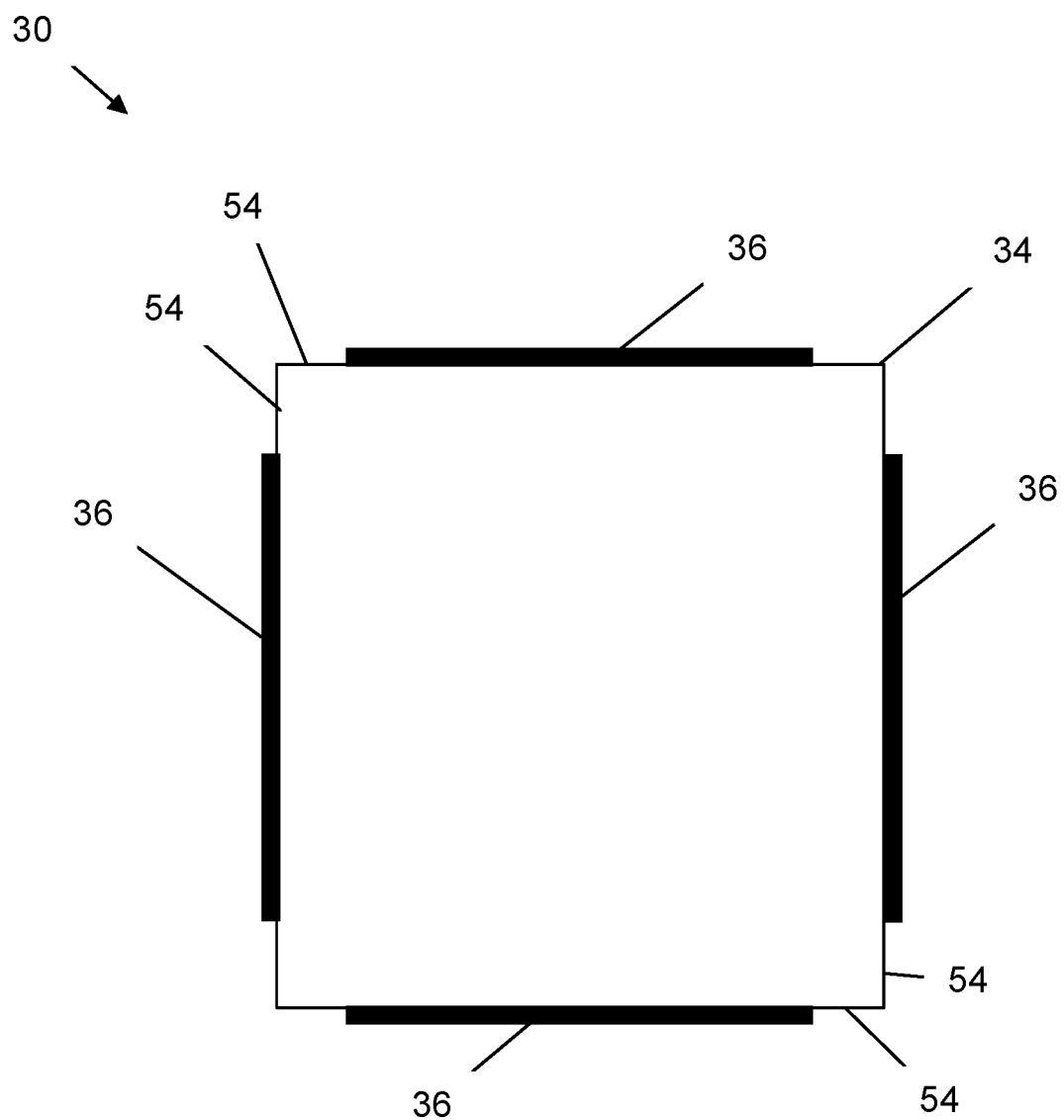
FIG. 11 is a front view of a wall panel.
Figure 12:
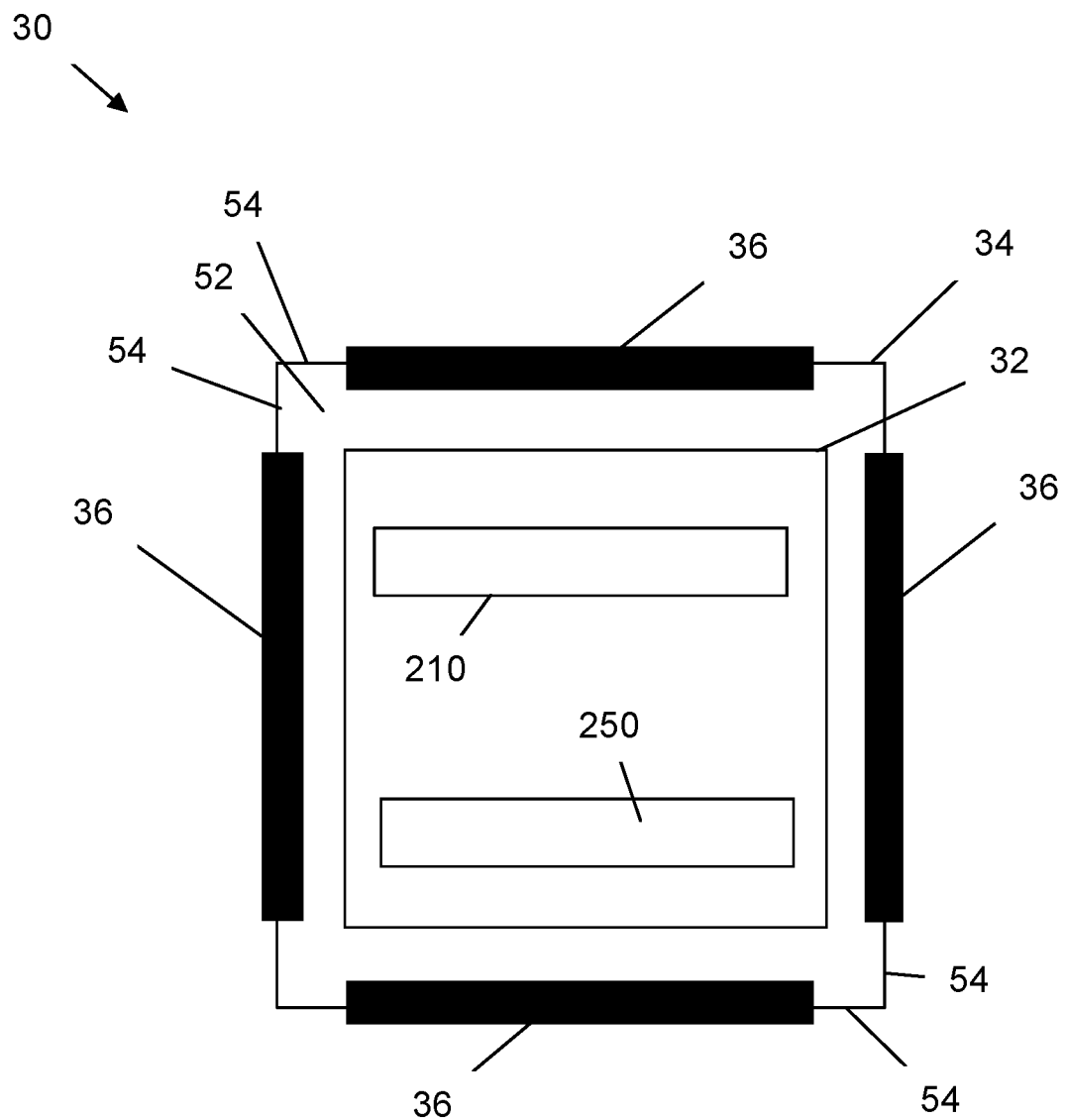
FIG. 12 is a rear view of the wall panel of FIG. 11.

In some embodiments, for example, the front surface 50 has one or more sides, for example, four sides, as depicted in FIG. 11 and FIG. 12. In some embodiments, for example, the rear surface 48 has one or more sides that correspond to the sides of the front surface 50, for example, four corresponding sides, as depicted in FIG. 11 and FIG. 12. In some embodiments, for example, the front surface 50 and the rear surface 48 of the glass panel 34 are connected by corresponding side surfaces 54 that extend between corresponding sides of the front surface 50 and the rear surface 50. In some embodiments, for example, as depicted in FIG. 11 and FIG. 12, the glass panel 34 has four side surfaces 54.

In some embodiments, for example, the front surface 50 has a shape with one side, for example, a circle or an oval. In some embodiments, for example, the front surface 50 has a shape with more than one side, such as a triangle, square, quadrilateral, or a polygon. In some embodiments, for example, as depicted in FIG. 11 and FIG. 12, the front surface has a four-sided shape. In some embodiments, for example, the shape of the rear surface 48 corresponds to the shape of the front surface 50.

In some embodiments, for example, the surfaces 44 and 46 of the reinforcing substrate 32 have a shape that corresponds to the shape of the front surface 50. In some embodiments, for example, as depicted in FIG. 11 and FIG. 12, both the glass panel 34 and the reinforcing substrate 32 have a four-sided shape.

In some embodiments, for example, the reinforcing substrate 32 includes a honeycomb skeletal structure 42 within the body 38 to provide strength and rigidity to the reinforcing substrate 32, and to the glass panel 34 while the reinforcing substrate 32 is connected to the glass panel 34. In some embodiments, for example, the honeycomb skeletal structure 42 is interposed between the surfaces 44 and 46, such that the load bracket 150 of the first mounting system 100 and the load bracket 250 of the second mounting system 200 may be mounted to the reinforcing substrate 32 of the load 30, in particular, using the surface 44. In some embodiments, for example, the reinforcing substrate 32 is manufactured using metal, such as aluminum. Suitable example reinforcing substrates 32 include the aluminum honeycomb panels supplied by Pacific Panel®.

In some embodiments, the load 30 includes a cushioning member 36. In some embodiments, for example, the cushioning member 36 is overlaying at least a portion of the side surface 54, such that at least a portion of a wall panel side surface 55 is defined by the cushioning member 36, as depicted in FIG. 13. In some embodiments, for example, the cushioning member 36 extends around the load 30, and in particular, around the glass panel 34. In some embodiments, for example, the wall panel 30 includes one cushioning member 36 that overlays the entire perimeter edge of the glass panel 34. In some embodiments, for example, the wall panel 30 includes a cushioning member 36 for each one of the sides of the glass panel 34, such that a cushioning member 36 overlays at least a portion of the side surface 54.

In some embodiments, for example, the reinforcing substrate 32 and the glass panel 34 are co-operatively configured such that while the reinforcing substrate 32 is connected to the glass panel 34, an exposed surface portion 52 of the surface 48 of the glass panel 34 is defined, the exposed surface portion 52 configured for mounting of the cushioning member 36 to the glass panel 34, such that the cushioning member 36 may be connected to the glass panel 34, in particular, on the surface portion 52, as depicted in FIG. 12 and FIG. 13. In some embodiments, for example, the reinforcing substrate 32 and the glass panel 34 are co-operatively configured such that while the reinforcing substrate 32 is connected to the glass panel 34, the surface portion 52 is defined around the entire reinforcing substrate 32, as depicted in FIG. 12. In some embodiments, for example, while the reinforcing substrate 32 is connected to the surface 48, a majority of the surface 48 is obscured by the reinforcing substrate 32.

In some embodiments, for example, the reinforcing substrate 32 includes at least one side surface 39, and the glass panel 34 includes at least one side surface 54. In some embodiments, for example, the side surface 39 is a surface on the perimeter of the reinforcing substrate 32. In some embodiments, for example, the side surface 39 is a surface that extends between the front surface 46 and rear surface 44 of the reinforcing substrate 32. In some embodiments, for example, the side surface 54 is a surface on the perimeter of the glass panel 34. In some embodiments, for example, the side surface 54 is a surface that extends between the front surface 50 and rear surface 48 of the glass panel 34. The glass panel 34 and the reinforcing substrate 32 are co-operatively configured such that at least a portion of the surface portion 52 is defined between at least one side surface 39 of the reinforcing substrate 32 and at least one side surface 54 of the glass panel 34. In some embodiments, for example, at least one side surface 39 of the reinforcing substrate 32 is offset from at least one side surface 54 of the glass panel 34 to define the surface portion 52 between the side surface 39 and the side surface 54.

In some embodiments, for example, the cushioning member 36 is connected to the glass panel 34, on the same surface of the glass panel 34 as the reinforcing substrate 32, using adhesives, such as the surface 48, as depicted in FIG. 12. In some embodiments, for example, as depicted in FIG. 13, the cushioning member 36 is connected to the surface 48, such as at the surface portion 52, and to the side surface 54 of the glass panel 34.

In some embodiments, for example, a side surface 54 of a glass panel 34 of a first load 30, such as a first wall panel 30, is configured to be disposed opposite to an side surface 54 of a glass panel 34 of a second load 30, such as a second wall panel 30, that is positioned adjacent the first load 30. In some embodiments, for example, an side surface 54 of a glass panel 34 of a first load 30, such as a first wall panel 30, is configured to be disposed opposite to an side surface 54 of a glass panel 34 of a second load 30, such as a second wall panel 30, while the first wall panel 30 is mounted adjacent to the second wall panel 30 on a wall, stud, or supporting member 20 using the system 10.

In some embodiments, for example, the wall panel side surface portion 55 is configured for becoming disposed in abutting engagement with a side surface portion 55 of another wall panel 30.

In some embodiments, for example, the cushioning member 36 is configured to protect the side surfaces 54 of the glass panel 34. In some embodiments, for example, while the wall panel side surface portion 55 is disposed in engagement with a side surface portion 55 of another wall panel 30, such that the cushioning member 36 is engaged to the other wall panel 30, the cushioning member 36 experiences more stress than the glass panel 34. In some embodiments, for example, in response to engagement, the cushioning member 36 is compressed or is deformed. In this regard, the glass panel 34 experiences less stress, and is protected from damage or wear and tear, for example, while the glass panel 34 is installed.

In some embodiments, for example, the cushioning member 36 is a silicone rubber sealant.

In some embodiments, for example, while adjacent wall panels 30 are joined, for example, butt-joined, abutting cushioning members 36 of the adjacent wall panels 30 are joined and control flow of sound and temperature through the abutting cushioning members 36.

In some embodiments, for example, the cushioning members 36 are configured to protect the glass panel 34, and also configured to control sound and temperature between two wall panels 30 when cushioning members 36 of the two wall panels 30 are abutting against each other.

Figure 10:
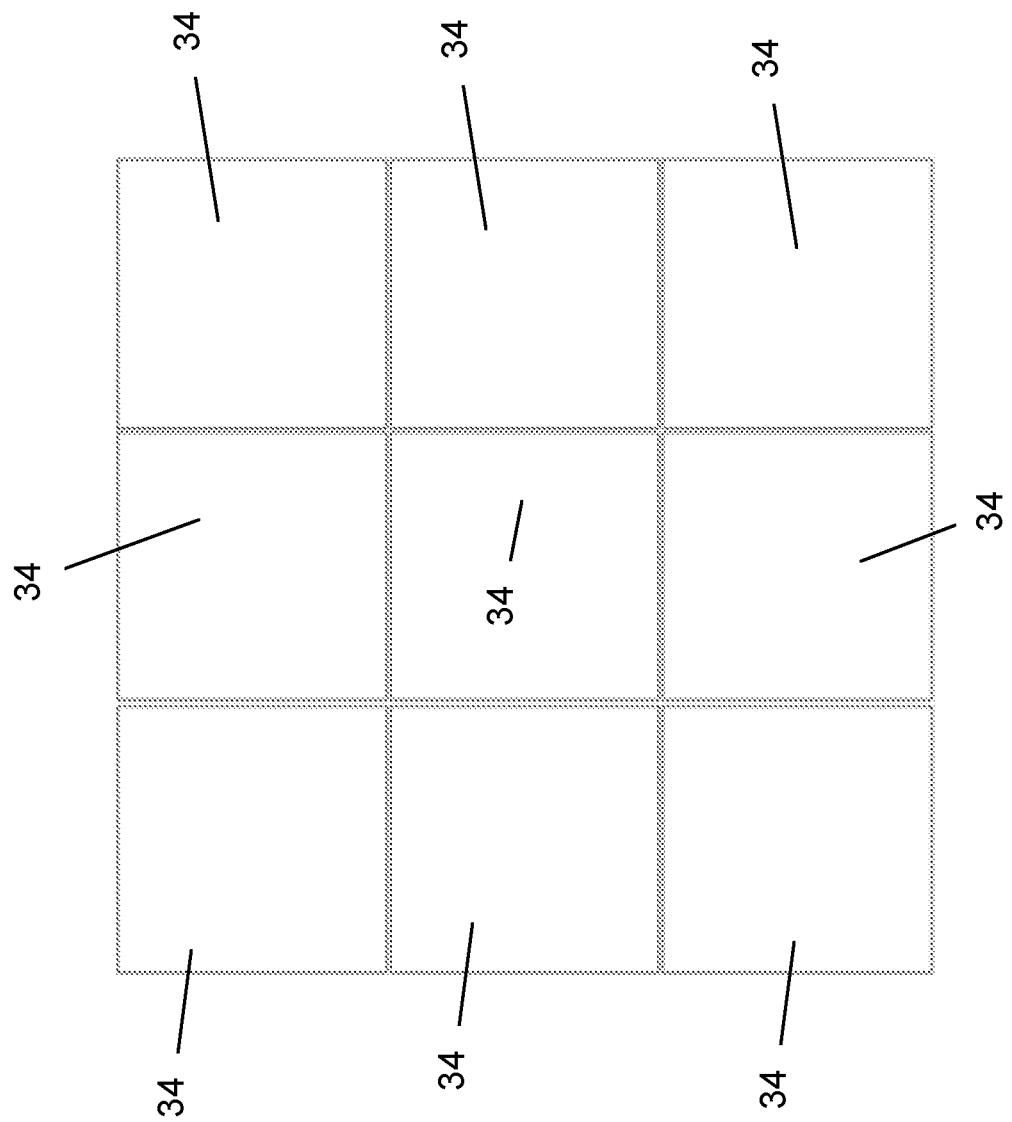
FIG. 10 is an elevation view of wall panels mounted to studs using the system of FIG. 1.

The cushioning member 36 is configured to provide a seal 62 at an interface 60 defined between two loads 30, as depicted in FIG. 10 and FIG. 13. In some embodiments, for example, the cushioning member 36 of a first wall panel 30 is configured to abut a cushioning member 36 of a second wall panel 30 that is positioned adjacent the first wall panel 30. While the cushioning member 36 of the first wall panel 30 is abutting the cushioning member 36 of the second wall panel 30 that is positioned adjacent the first wall panel 30, the abutting sealing members 36 define a seal 62 that seals the interface 60 defined between the two wall panels 30, as depicted in FIG. 13.

In some embodiments, for example, the cushioning member 36 meets the fire rating standard E-84.

In some embodiments, for example, the seal 62 is configured to function as acoustics and temperature control for a room in which the wall panels 30 are installed, by sealing the gap in between two wall panels 30.

In some embodiments, for example, the cushioning member 36 is defined by one gasket or seal, or is defined by more than one gasket or seal.

In some embodiments, for example, where the load 30, which includes the reinforcing substrate 32, the glass panel 34, and the cushioning member 36, is pre-assembled prior to delivery to the construction site, on-site assembly of the load 30, which may include applying adhesive or silicone to the glass panel 34 to connect the reinforcing substrate 32 or the cushioning member 36, may be avoided or reduced.

Figure 6:
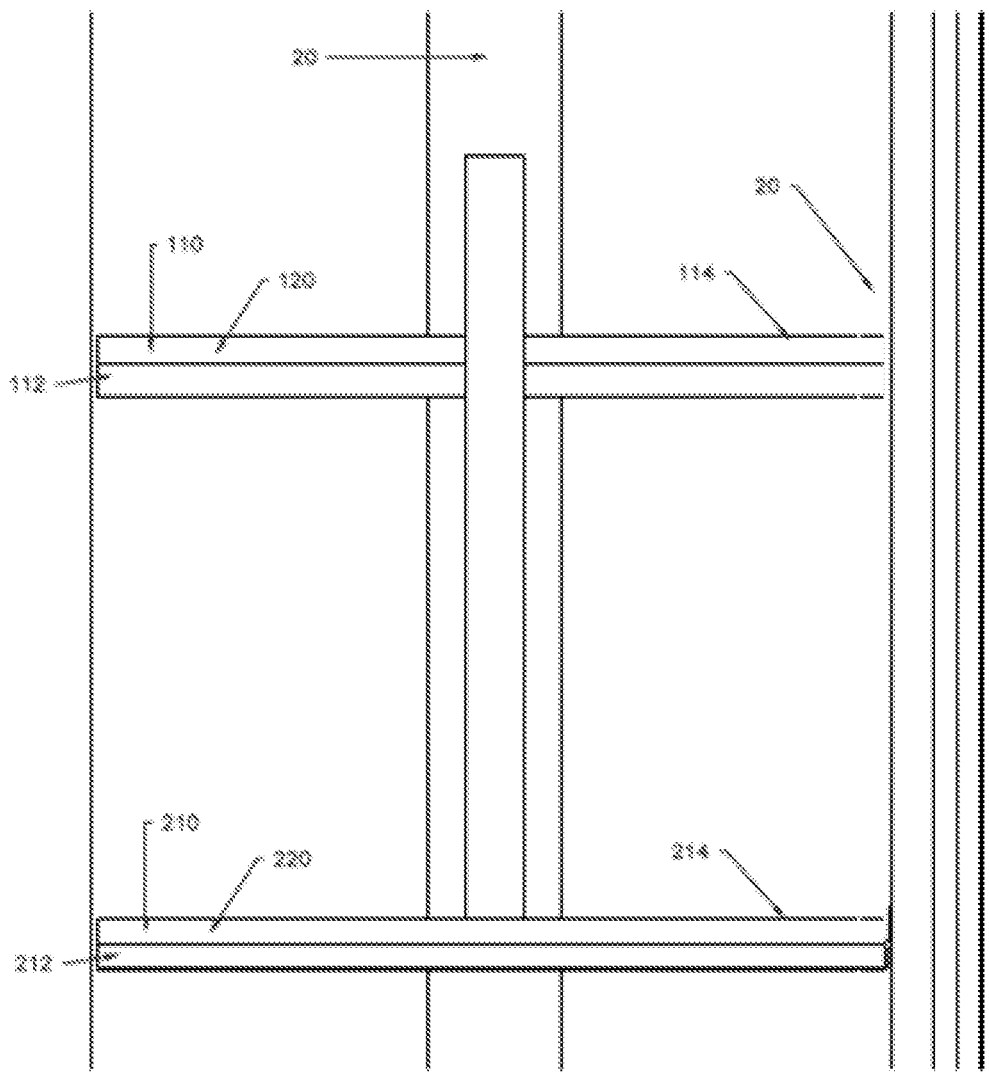
FIG. 6 is an elevation view of the wall brackets of the first and second mounting systems mounted to a stud.
Figure 7:
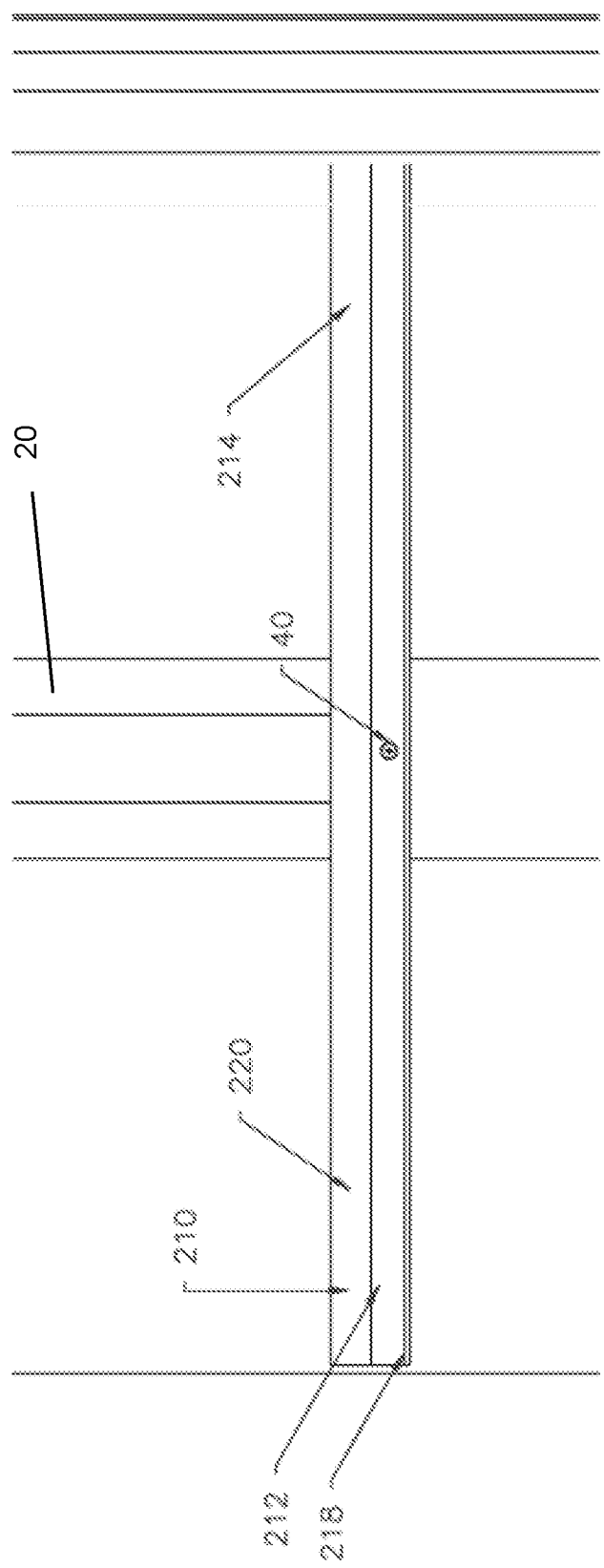
FIG. 7 is an elevation view of the wall bracket of the second mounting system mounted to a stud.

As depicted in FIG. 6 and FIG. 7, the wall bracket 110 of the first mounting system 100 and the wall bracket 210 of the second mounting system 200 are connected to studs 20. In some embodiments, for example, the wall bracket 110 of the first mounting system 100 and the wall bracket 210 of the second mounting system 200 are connected to at least two studs 20 using fasteners. In some embodiments, for example, as depicted in FIG. 6, the wall bracket 110 of the first mounting system 100 is positioned above the wall bracket 210 of the second mounting system 200 when the wall bracket 110 of the first mounting system 100 and the wall bracket 210 of the second mounting system 200 are connected to studs 20.

Figure 8:
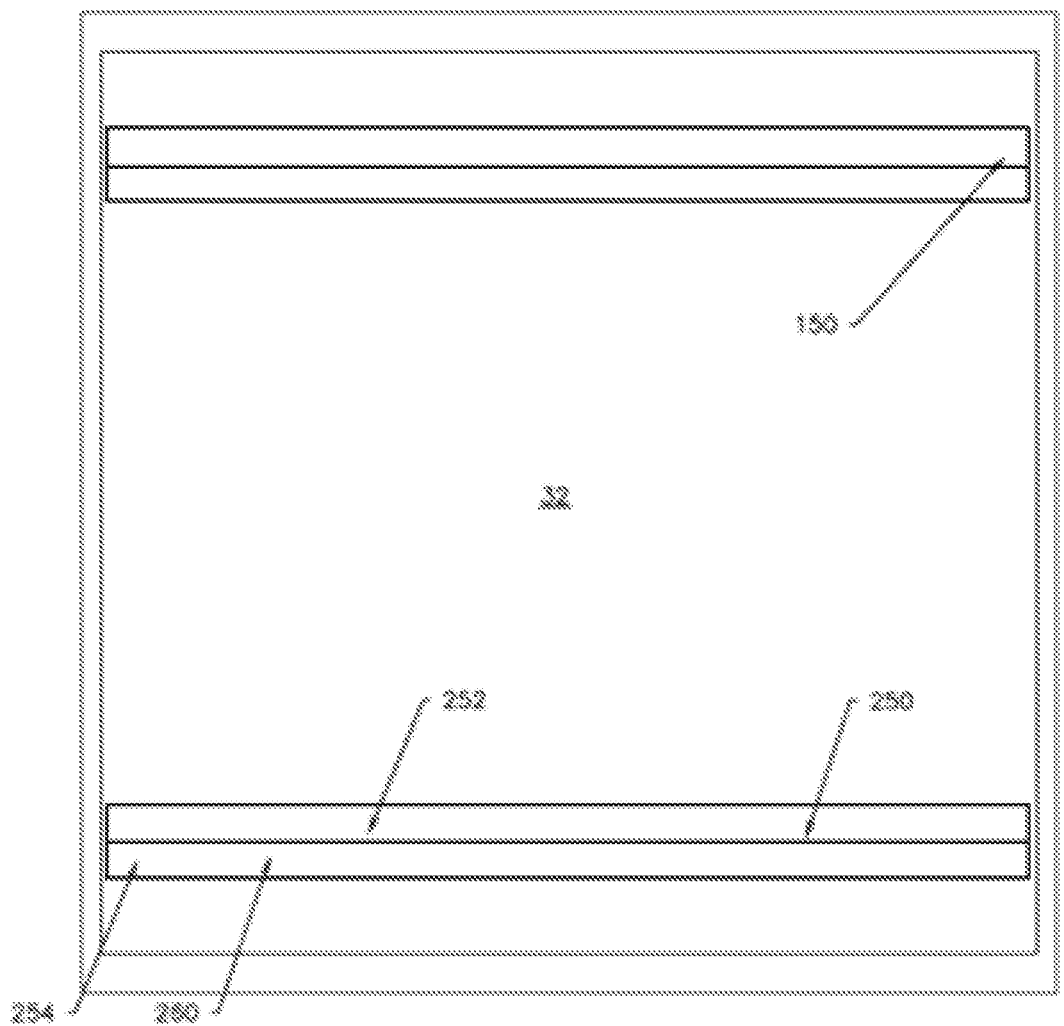
FIG. 8 is an elevation view of the load brackets of the first and second mounting systems mounted to a wall panel.
Figure 9:
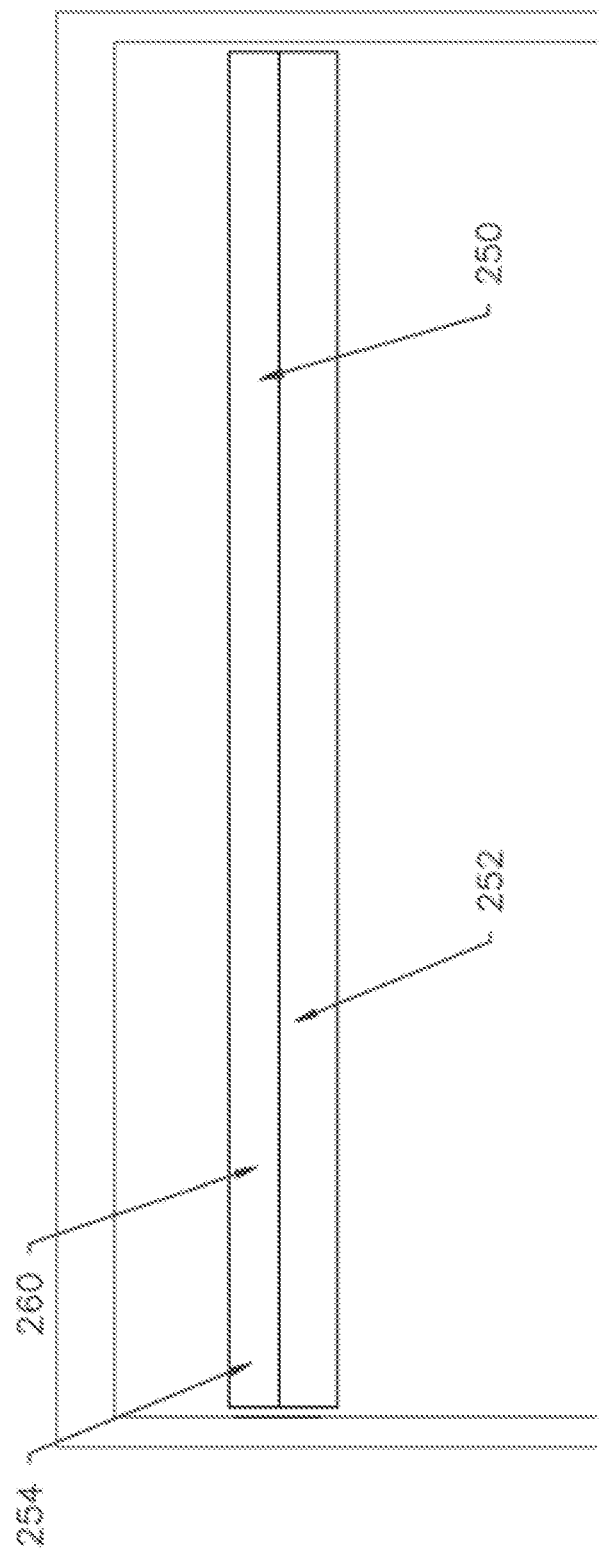
FIG. 9 is an elevation view of the load bracket of the second mounting system mounted to a wall panel.

As depicted in FIG. 8 and FIG. 9, the load bracket 150 of the first mounting system 100 and the load bracket 250 of the second mounting system 200 are connected to the load 30, such as the exposed facing of the reinforcing substrate 32. In some embodiments, for example, the load bracket 150 of the first mounting system 100 and the load bracket 250 of the second mounting system 200 are connected to the reinforcing substrate 32 at multiple points using fasteners 40. In some embodiments, for example, as depicted in FIG. 8, the load bracket 150 of the first mounting system 100 is positioned above the load bracket 250 of the second mounting system 200 when the load bracket 150 of the first mounting system 100 and the load bracket 250 of the second mounting system 200 are connected to the load 30. In some embodiments, the distance between the wall bracket 110 of the first mounting system 100 and the wall bracket 210 of the second mounting system 200 is the same, or generally similar, to the distance between the load bracket 150 of the first mounting system 100 and the load bracket 250 of the second mounting system 200.

With the wall bracket 110 of the first mounting system 100 and the wall bracket 210 of the second mounting system 200 connected to studs 20, and the load bracket 150 of the first mounting system 100 and the load bracket 250 of the second mounting system 200 are connected to the load 30, the load 30 is lifted such that the load bracket 150 of the first mounting system 100 and the load bracket 250 of the second mounting system 200 are positioned over the wall bracket 110 of the first mounting system 100 and the wall bracket 210 of the second mounting system 200, respectively. In some embodiments, for example, the load 30 is lifted a distance that is at least the height or vertical length of the retaining flange 114 of the wall bracket 110 of the first mounting system 100 or the retaining flange 214 of the wall bracket 210 of the second mounting system 200. The load 30 is then lowered such that the retainable flange 154 of the load bracket 150 of the first mounting system 100 is received in the receiving space 122 defined by the wall bracket 110 of the first mounting system 100, the retainable flange 254 of the load bracket 250 of the second securing system 100 is received in the receiving space 222 defined by the wall bracket 210 of the second mounting system 200, and the load 30 is supported by the ledge 218. In some embodiments, for example, the retainable flange 154 of the load bracket 150 of the first mounting system 100 is loosely received in the receiving space 122 defined by the wall bracket 110 of the first mounting system 100, the retainable flange 254 of the load bracket 250 of the second securing system 100 is loosely received in the receiving space 222 defined by the wall bracket 210 of the second mounting system 200, and the load 30 is supported by the ledge 218. In such embodiments, for example, the load 30 is loosely secured to the wall frame 20 while being supported by the ledge 218.

In some embodiments, for example, while the load 30 is supported by the ledge 218, the retaining flange 114 of the wall bracket 110 of the first mounting system 100 is received, or loosely received, in the receiving space 162 defined by the load bracket 150 of the first mounting system 100.

In some embodiments, for example, while the load 30 is supported by the ledge 218, the retaining flange 214 of the wall bracket 210 of the second mounting system 200 is received, or loosely received, in the receiving space 262 defined by the load bracket 250 of the second mounting system 200.

In some embodiments, for example, while the load 30 is supported by the ledge 218, the space 126 is defined between the lower end surface 164 of the retainable flange 154 of the load bracket 150 of the first mounting system 100 and the connecting member 116 of the wall bracket 110 of the first mounting system 100.

In some embodiments, for example, while the load 30 is supported by the ledge 218, the space 226 is defined between the lower end surface 264 of the retainable flange 254 of the load bracket 250 of the second mounting system 200 and the connecting member 216 of the wall bracket 210 of the second mounting system 200.

In some embodiments, for example, while the load 30 is supported by the ledge 218, the space 166 is defined between the upper end surface 124 of the retaining flange 114 of the wall bracket 110 of the first mounting system 100 and the connecting member 156 of the load bracket 150 of the first mounting system 100.

In some embodiments, for example, while the load 30 is supported by the ledge 218, the space 266 is defined between the upper end surface 224 of the retaining flange 214 of the wall bracket 210 of the second mounting system 200 and the connecting member 256 of the load bracket 250 of the second mounting system 200.

At this point, with the load 30 secured to the wall frame 20, the weight of the load 30 is supported by the ledge 218, while the retaining flange 114 of the wall bracket 110 of the first mounting system 100 and the retaining flange 214 of the wall bracket 210 of the second mounting system 200 resists displacement of the load 30 away from the wall frame 20.

When the load 30 is secured to the wall frame 20, the glass panel 34 is facing outwardly, such that the glass panel 34 is seen while obscuring the wall frame 20 from view.

In some embodiments, where the load 30 is loosely secured to the wall frame 20, the load 30 may be lifted to disengage the wall bracket 110 and the load bracket 150 of the first mounting system 100 and the wall bracket 210 and the load bracket 250 of the second mounting system 200.

Figure 15:
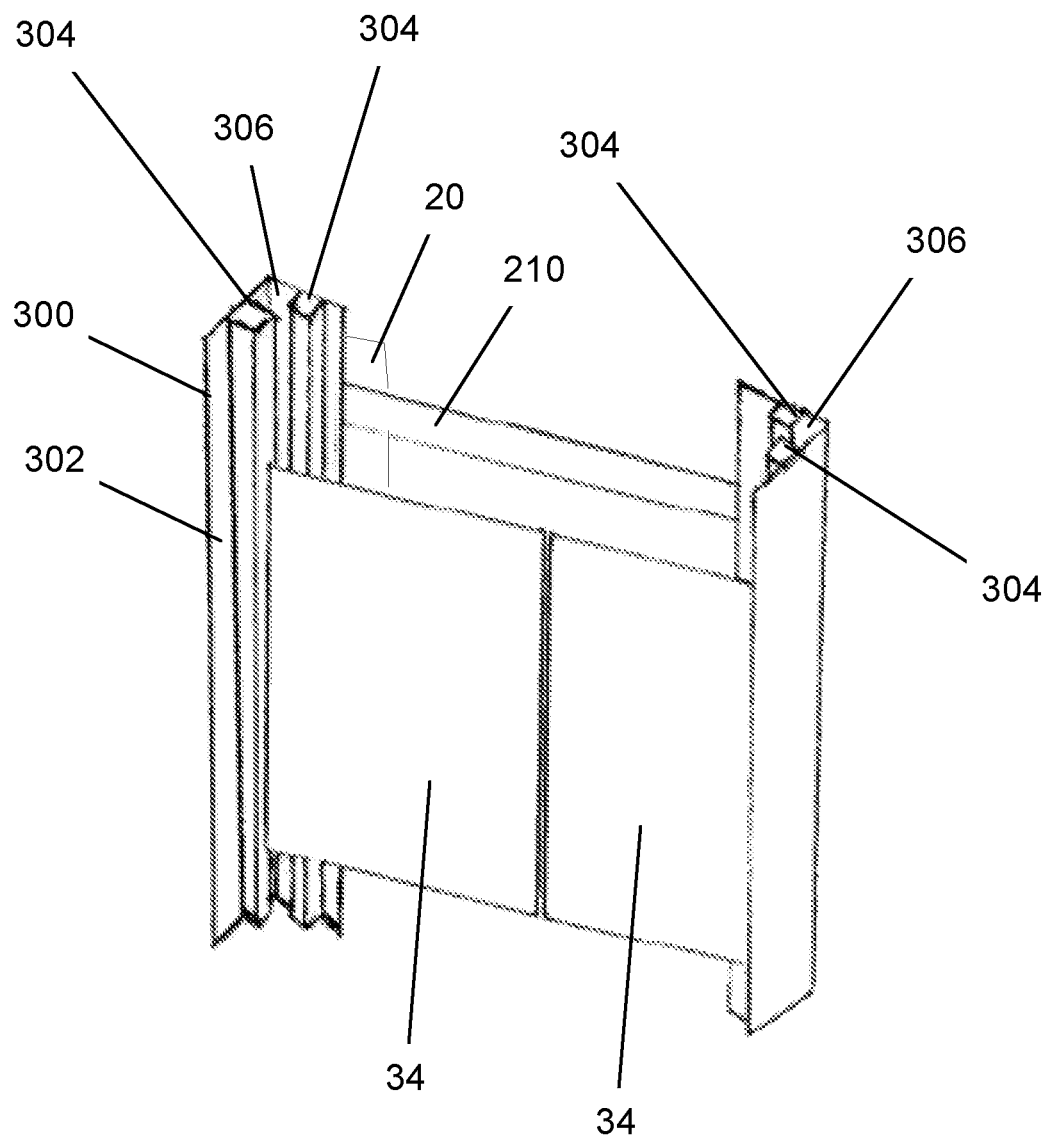
FIG. 15 is a perspective view of wall panels disposed in abutting engagement to define a wall between two corner brackets.
Figure 16:
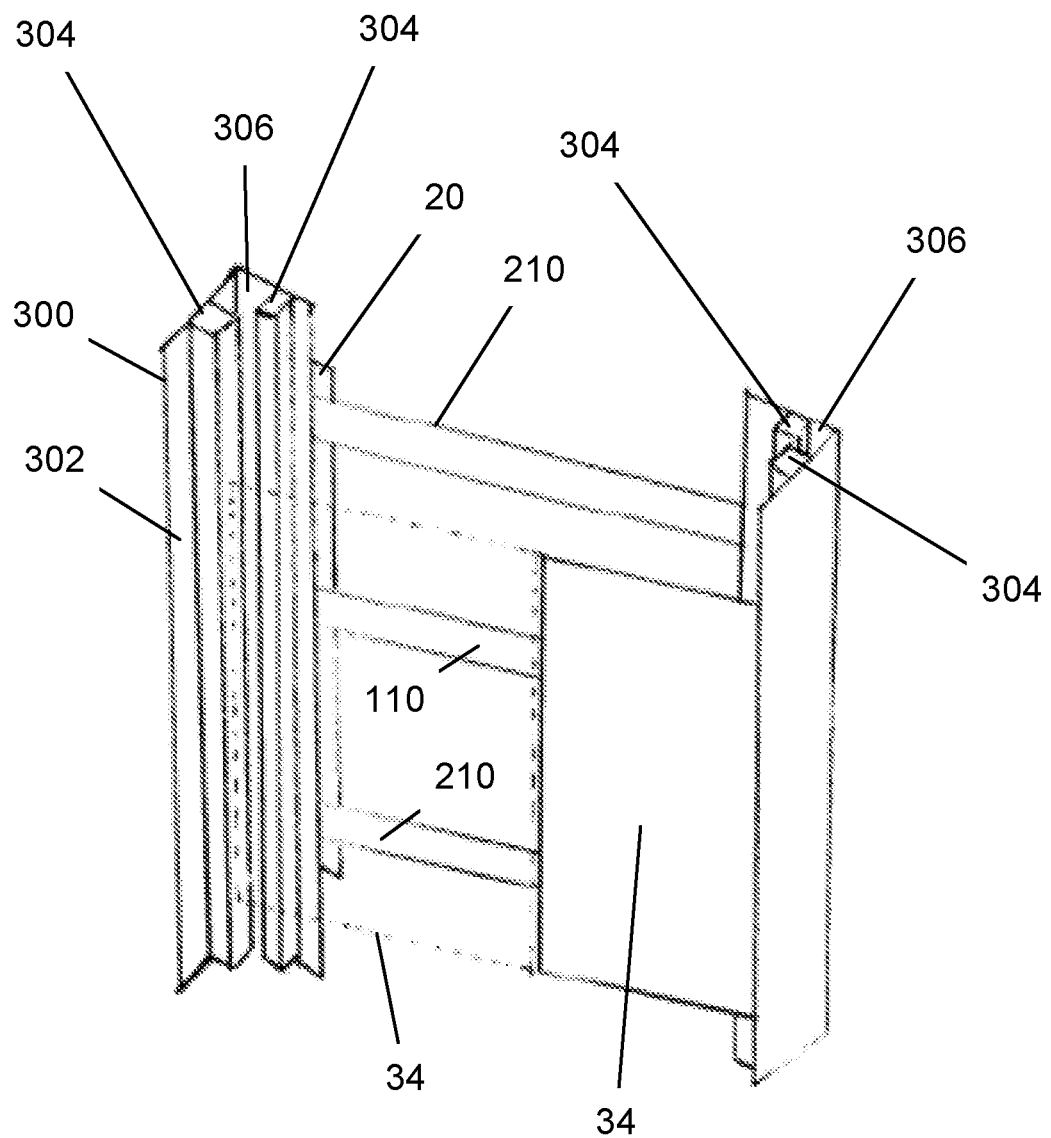
FIG. 16 is a perspective of wall panels disposed in abutting engagement to define a wall between two corner brackets, with one of the wall panels depicted in dashed line.

A plurality of loads 30, for example, wall panels 30 that include the reinforcing substrate 32 and the glass panel 34, may be secured to studs 20 using the system 10 as described herein to install a wall defined by a plurality of wall panels 30, with the cushioning member 36 disposed between the glass panels 34, as depicted in FIG. 10, FIG. 15, and FIG. 16. In some embodiments, for example, each one of the wall panels 30, independently, is a composite panel, the composite panel including a glass panel 34 and a reinforcing substrate 32 connected to the rear surface 48 of the glass panel 34.

By securing the load 30 to the wall frame 20 using the system 10, it may facilitate leveling of the load 30 relative to the floor. In some embodiments, for example, the weight of the load 30 is supported solely by the ledge 218. In such embodiments, the user only has to level one component of the system 10, namely the ledge 218, relative to the floor to level the load 30 when the load 30 is supported by the ledge 218. By supporting the load 30 solely with the ledge 218, the risk of incorrect leveling of the load 30 due to having multiple points of contact with a securing system and the load 30 is avoided or reduced. In this regard, during manufacturing, particular attention may be directed to the ledge 218 and the load 30 such that the reinforcing substrate 32 is configured to be supported on the ledge 218. By directing attention to the manufacturing of the ledge 218 and the load 30, the leveling of the load 30 relative to the floor may be improved, on-site adjustments of the system 10 may be avoided or reduced.

Figure 14:
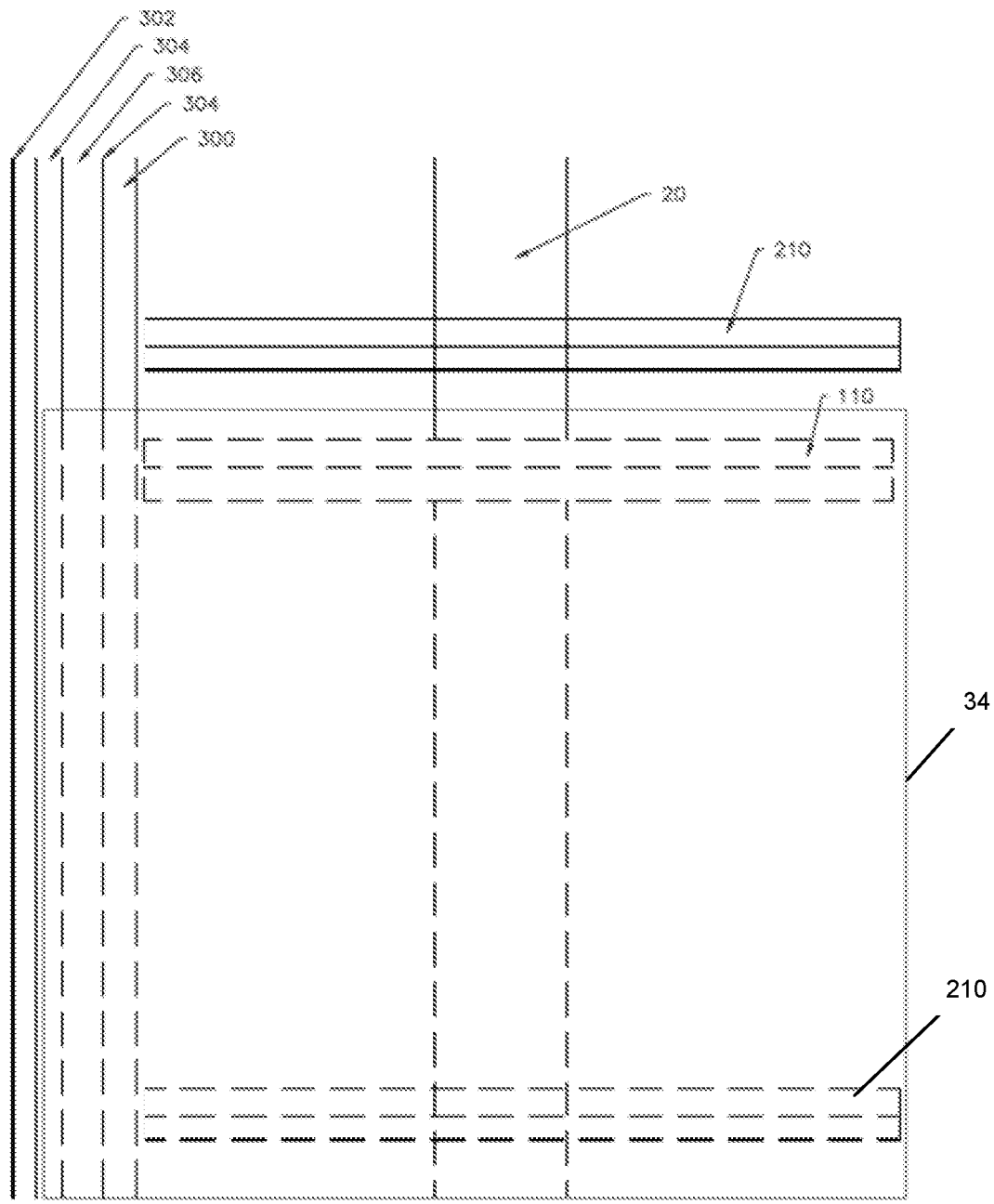
FIG. 14 is an elevation view of a wall panel mounted to studs and disposed in engagement with a corner bracket.

In some embodiments, for example, a corner bracket 300 is be installed in the corner of a room when securing the loads 30 to the studs 20, as depicted in FIG. 14, FIG. 15, and FIG. 16. The corner bracket 300 is configured to obscure the underlying components, such as the studs 20, insulation, wood, and other building materials, and provide a pleasant aesthetic as a decorative trim at the corner of the room.

As depicted in FIG. 14, FIG. 15, and FIG. 16, the corner bracket 300 has a body 302. In some embodiments, for example, the body 302 has an L-shape or a W-shape body. In some embodiments, for example, the bracket 300 includes one or more ribs 304 that are configured to engage with the load 30. In some embodiments, for example, the ribs 304 are configured to abut against the load 30, for example, the cushioning member 36 of a wall panel 30. In some embodiments, for example, the body 302 and the ribs 304 of the corner bracket 300 are co-operatively configured to define one or more channels 306. In some embodiments, for example, appropriate fasteners, such as tape or adhesives, may be inserted in the channels 306 to connect the corner bracket 300 and the load 30. In some embodiments, for example, the channels 306 may be configured to receive insulation as part of the completion of the room.

In some embodiments, for example, a kit for assembling a wall between a first corner and a second corner of a room, wherein the first corner is horizontally spaced from the second corner by a first distance, includes the corner bracket 300. In some embodiments, for example, the kit includes a plurality of wall panels 30 that are configured to be mounted in end-to-end configuration or in series configuration between the first and second corners, such that a plurality of mounted walls panels 30 are obtained. The wall panels 30 and the corner bracket 300 are co-operatively configured such that, while: (i) the wall panels 30 are mounted in the end-to-end configuration, starting from the first corner and extending towards the second corner, such that a gap is defined between the last one of the wall panels 30 and the second corner, and (ii) the corner bracket 300 is mounted at the second corner, the corner bracket 300 extends from the second corner such that the wall panels 30 are disposed in overlapping relationship with the corner bracket 300. In some embodiments, for example, while the wall panels 30, such as the last of the wall panels 30, is in overlapping relationship with the corner bracket 300, the gap is concealed or covered by the corner bracket 300, as depicted in FIG. 14, FIG. 15, and FIG. 16. In some embodiments, for example, the corner bracket 300, or a portion of the corner bracket 300, such as a leg of the corner bracket 300 that defines a portion of the L-shape or W-shape body of the corner bracket 300, is received in the gap to fill at least a portion of the space defined by the gap, while the gap is concealed or covered by the corner bracket 300, as depicted in FIG. 14, FIG. 15, and FIG. 16. In such embodiments, for example, the gap between the last of the wall panels 30 and the corner is absent or substantially absent, as the corner bracket 300 has filled in gap by being received in the gap. By assembling a wall between a first corner and a second corner of a room using the wall panels 30 and the corner bracket 300, the corner of the room may have an aesthetically pleasing look, and the building materials are obscured or covered from view.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be examples only. The invention is defined by the appended claims.

What is claimed is:

1. A system for mounting a load to a wall frame, the system comprising:
a first mounting system and a second mounting system, wherein:
the first mounting system includes a wall bracket and a load bracket;
the second mounting system includes a wall bracket and a load bracket;
wherein:
the wall bracket of the first mounting system includes:
a mounting flange configured for mounting the wall bracket of the first mounting system to the wall frame; and
a retaining flange;
the load bracket of the first mounting system includes:
a mounting flange configured for mounting the load bracket of the first mounting system to the load; and
a retainable flange;
the wall bracket of the second mounting system includes:
a mounting flange configured for mounting the wall bracket of the second mounting system to the wall frame;
a retaining flange; and
a ledge configured to vertically support the load;
the load bracket of the second mounting system includes:
a mounting flange configured for mounting the load bracket of the second mounting system to the load; and
a retainable flange;
the wall frame, the wall bracket of the first mounting system, and the wall bracket of the second mounting system are co-operatively configured such that:
while: (i) the wall bracket, of the first mounting system, is connected to the wall frame, and (ii) the wall bracket, of the second mounting system, is connected to the wall frame:
a first receiving space is defined between the wall frame and the retaining flange of the wall bracket of the first mounting system; and
a second receiving space is defined between the wall frame and the retaining flange of the wall bracket of the second mounting system,
such that a mounting-ready wall frame is established;
the load, the load bracket of the first mounting system, and the load bracket of the second mounting system are co-operatively configured such that:
while: (i) the load bracket, of the first mounting system, is connected to the load, and (ii) the load bracket, of the second mounting system, is connected to the load, a mountable configuration is established; and
the mounting-ready wall frame and the mountable configuration are co-operatively configured such that the mountable configuration is receivable by the mounting-ready wall frame, and the receiving of the mountable configuration by the mounting-ready wall frame is with effect that:
the retainable flange of the load bracket of the first mounting system becomes received within the first receiving space;
the retainable flange of the load bracket of the second mounting system becomes received within the second receiving space; and
the load, of the mountable configuration, becomes disposed in contact engagement with the ledge, such that the load becomes seated on the ledge.

2. The system of claim 1, wherein:
the mounting flange of the wall bracket of the second mounting system includes a wall-abutting surface configured for disposition in an abutting relationship relative to the wall frame to which mounting flange is mountable;
the ledge of the wall bracket of the second mounting system includes a seating surface, for effecting the seating of the load on the ledge; and
the seating surface has a normal axis that is perpendicular to a normal axis of the wall-abutting surface of the mounting flange of the wall bracket of the second mounting system.

3. The system of claim 1, wherein:
the mounting-ready wall frame and the mountable configuration are co-operatively configured such that:
the receiving of the retainable flange of the load bracket of the first mounting system within the first receiving space is such that the retaining flange of the wall bracket of the first mounting system is disposed in opposition to displacement of the retainable flange of the load bracket of the first mounting system away from the wall frame; and
the receiving of the retainable flange of the load bracket of the second mounting system within into the second receiving space is such that the retaining flange of the wall bracket of the second mounting system is disposed in opposition to displacement of the retainable flange of the load bracket of the second mounting system away from the wall frame;
such that displacement of the mountable load away from the wall frame is opposed.

4. The system of claim 1; wherein:
the mounting-ready wall frame and the mountable configuration are co-operatively configured such that:
the receiving of the retainable flange of the load bracket of the first mounting system within into the first receiving space is such that the retaining flange of the wall bracket of the first mounting system is opposing displacement of the retainable flange of the load bracket of the first mounting system along an axis that is normal to a surface of the wall frame to which the mounting flange of the wall bracket of the first mounting system is mounted; and
the receiving of the retainable flange of the load bracket of the second mounting system within into the second receiving space is such that the retaining flange of the wall bracket of the second mounting system is opposing displacement of the retainable flange of the load bracket of the second mounting system along an axis that is normal to a surface of the wall frame to which the mounting flange of the wall bracket of the second mounting system is mounted;
such that displacement of the mountable load in a direction along an axis that is normal to a surface of the wall frame is opposed.

5. The system of claim 1, wherein:
the mounting-ready wall frame and the mountable configuration are co-operatively configured such that, while the mountable configuration is received by the mounting-ready wall frame:
there is an absence of vertical support of the retainable flange of the load bracket of the first mounting system by the wall bracket of the first mounting system; and there is an absence of vertical support of the retainable flange of the load bracket of the second mounting system by the wall bracket of the second mounting system.

6. The system of claim 1, wherein:
the first mounting system is an upper mounting system for effecting mounting of an upper portion of the load to the wall frame;
the second mounting system is a lower mounting system for effecting mounting of a lower portion of the load to the wall frame.

7. The system of claim 1; wherein:
the mounting flange of the load bracket of the first mounting system is mountable to an upper portion of the load; and
the mounting flange of the load bracket of the second mounting system is mountable to a lower portion of the load.

8. The system of claim 1, wherein the seating of the load on the ledge is such that the load is vertically supported by the ledge.

9. The system of claim 1, wherein the wall frame and the wall bracket of the second mounting system are further co-operatively configured such that, while the mounting-ready wall frame is established, the ledge extends perpendicularly from the wall frame.

10. The system of claim 1, wherein the wall frame, the wall bracket of the first mounting system, and the wall bracket of the second mounting system are further co-operatively configured such that, while the mounting-ready wall frame is established, the wall bracket of the first mounting system is disposed above the wall bracket of the second mounting system.

11. The system of claim 1, wherein the mounting-ready wall frame and the mountable configuration are further co-operatively configured for emplacement of the mountable configuration into alignment with mounting-ready wall frame such that an aligned relationship is established, and the receiving of the mountable configuration by the mounting-ready wall frame is effectible, while the aligned relationship is established, in response to downwardly displacement of the mountable configuration relative to the mounting-ready wall frame.

12. The system of claim 11, wherein the aligned relationship is established while:
the retainable flange of the load bracket of the first mounting system is disposed in vertical alignment with the first receiving space; and
the retainable flange of the load bracket of the second mounting system is disposed in vertical alignment with the second receiving space.

13. The system of claim 1, wherein the load defines a planar surface, wherein the contact engagement is effectuated between the planar surface and the ledge.

14. The system of claim 13, wherein the planar surface is a bottom surface of the load.

15. The system of claim 1, wherein the receiving of the mountable configuration by the mounting-ready wall frame is with effect that the mountable configuration becomes mounted to the mounting-ready wall frame such that a mounted configuration is established.

16. The system of claim 15, wherein the mounting of mountable configuration to the mounting-ready wall frame is such that the mountable configuration is hung from the mounting-ready wall frame.

17. The system of claim 16, wherein the wall frame extends from a floor, and the mounting-ready wall frame and the mountable configuration are co-operatively configured such that, while the mounted configuration is established, the load is level with the floor.

18. A wall system comprising:
a wall frame;
at least one wall panel, wherein each one of the at least one wall panel, independently, includes:
a front surface;
a rear surface disposed on an opposite side of the wall panel relative to the front surface;
an upper panel bracket including:
a mounting flange, secured to the rear surface, with effect that the upper panel bracket is mounted to the wall panel; and
a retainable flange;
and
a lower panel bracket including:
a mounting flange, secured to the rear surface, with effect that the lower panel bracket is mounted to the wall panel below the upper panel bracket; and
a retainable flange;
such that at least one mountable wall panel configuration is established;
an upper wall bracket including:
a mounting flange, secured to the wall frame, with effect that the upper wall bracket is mounted to the wall frame; and
a retaining flange;
a lower wall bracket including:
a mounting flange, secured to the wall frame, with effect that the lower wall bracket is mounted to the wall frame vertically below the upper wall bracket;
a retaining flange; and
a ledge
the wall frame, the upper wall bracket, and the lower wall bracket are co-operatively configured such that:
while: (i) the upper wall bracket is connected to the wall frame, and (ii) the lower wall bracket is connected to the wall frame:
an upper receiving space is defined between the wall frame and the retaining flange of the upper wall bracket; and
a lower receiving space is defined between the wall frame and the retaining flange of the lower wall bracket;
such that a mounting-ready wall frame is established; and
for each one of the at least one mountable wall panel configuration, independently, the mounting-ready wall frame and the mountable wall panel configuration are co-operatively configured such that the mountable wall panel configuration is receivable by the mounting-ready wall frame, and the receiving of the mountable wall panel configuration by the mounting-ready wall frame is with effect that:
the retainable flange of the upper panel bracket becomes received within the upper receiving space;
the retainable flange of the lower panel bracket becomes received within the lower receiving space; and
the wall panel, of the mountable wall panel configuration, becomes disposed in contact engagement with the ledge, such that the wall panel becomes seated on the ledge.

19. The system as claimed in claim 18; wherein:
for each one of the at least one mountable wall panel configuration, independently, the mounting-ready wall frame and the mountable wall panel configuration are co-operatively configured such that:
the receiving of the retainable flange of the upper panel bracket within the upper receiving space is such that the retaining flange of the upper wall bracket is disposed in opposition to displacement of the retainable flange of the upper panel bracket away from the wall frame; and
the receiving of the retainable flange of the lower panel bracket within the lower receiving space is such that the retaining flange of the lower wall bracket is disposed in opposition to displacement of the retainable flange of the load bracket of the second mounting system away from the wall frame;
such that displacement of the wall panel away from the wall frame is opposed.

20. The system of claim 18; wherein:
for each one of the at least one mountable wall panel configuration, independently, the mounting-ready wall frame and the mountable wall panel configuration are co-operatively configured such that:
the receiving of the retainable flange of the upper panel bracket within the upper receiving space is such that the retaining flange of the upper wall bracket is opposing displacement of the retainable flange of the upper load bracket along an axis that is normal to a surface of the wall frame to which the mounting flange of the upper wall bracket is mounted; and
the receiving of the retainable flange of the lower panel bracket within the lower receiving space is such that the retaining flange of the lower wall bracket is opposing displacement of the retainable flange of the lower load bracket along an axis that is normal to a surface of the wall frame to which the mounting flange of the lower wall bracket is mounted;
such that displacement of the wall panel, relative to the wall frame, in a direction along an axis that is normal to a surface of the wall frame, is opposed.

21. The system of claim 18; wherein:
the mounting flange of the lower wall bracket includes a wall-abutting surface configured for disposition in an abutting relationship relative to the wall frame;
the ledge of the lower wall bracket includes a seating surface, for effecting the seating of the wall panel on the ledge; and
the seating surface has a normal axis that is perpendicular to a normal axis of the wall-abutting surface of the mounting flange of the lower wall bracket.

22. The system of claim 18; wherein:
for each one of the at least one mountable wall panel configuration, independently, the mounting-ready wall frame and the mountable wall panel configuration are co-operatively configured such that, while the mountable wall panel configuration is received by the mounting-ready wall frame:
there is an absence of vertical support of the retainable flange of the upper panel bracket by the upper wall bracket; and
for each one of the at least one panel, independently, there is an absence of vertical support of the retainable flange of the lower panel bracket by the lower wall bracket.

23. The system of claim 18; wherein:
each one of the at least one wall panel, independently, includes a glass panel.

24. The system of claim 18; wherein:
each one of the at least one wall panel, independently, is a composite wall panel; and
the composite panel includes a glass panel an a reinforcing substrate connected to the rear surface of the glass panel.

25. The system of claim 18; wherein:
the at least one wall panel is a plurality of wall panels.

26. The system of claim 18, wherein the seating of the wall panel on the ledge is such that the wall panel is vertically supported by the ledge.

27. The system of claim 18, wherein the wall frame and the lower wall bracket are further co-operatively configured such that, while the mounting-ready wall frame is established, the ledge extends perpendicularly from the wall frame.

28. The system of claim 18, wherein the wall frame, the upper wall bracket, and the lower wall bracket are further co-operatively configured such that, while the mounting-ready wall frame is established, the upper wall bracket is disposed above the lower wall bracket.

29. The system of claim 18, wherein the mounting-ready wall frame and the mountable wall panel configuration are further co-operatively configured for emplacement of the mountable wall panel configuration into alignment with mounting-ready wall frame such that an aligned relationship is established, and the receiving of the mountable wall panel configuration by the mounting-ready wall frame is effectible, while the aligned relationship is established, in response to downwardly displacement of the mountable wall panel configuration relative to the mounting-ready wall frame.

30. The system of claim 29, wherein the aligned relationship is established while:
the retainable flange of the upper panel bracket is disposed in vertical alignment with the upper receiving space; and
the retainable flange of the lower panel bracket is disposed in vertical alignment with the lower receiving space.

31. The system of claim 18, wherein the wall panel defines a planar surface, wherein the contact engagement is effectuated between the planar surface and the ledge.

32. The system of claim 31, wherein the planar surface is a bottom surface of the wall panel.

33. The system of claim 18, wherein the receiving of the mountable wall panel configuration by the mounting-ready wall frame is with effect that the mountable wall panel configuration becomes mounted to the mounting-ready wall frame such that a mounted wall panel configuration is established.

34. The system of claim 33, wherein the mounting of mountable wall panel configuration to the mounting-ready wall frame is such that the mountable wall panel configuration is hung from the mounting-ready wall frame.

35. The system of claim 34, wherein the wall frame extends from a floor, and the mounting-ready wall frame and the mountable wall panel configuration are co-operatively configured such that, while the mounted wall panel configuration is established, the wall panel is level with the floor.

36. A wall system comprising:
a wall frame;
at least one wall panel, each one of the at least one wall panel, independently, includes;
a front surface;
a rear surface disposed on an opposite side of the wall panel relative to the front surface;

a panel bracket including:
  a mounting flange, secured to the rear surface, with effect that the panel bracket is mounted to the wall panel; and
  a retainable flange;
  such that at least one mountable wall panel configuration is established;
a wall bracket including:
  a mounting flange, secured to the wall frame, with effect that the wall bracket is mounted to the wall frame;
  a retaining flange; and
  a ledge;
the wall frame and the wall bracket are co-operatively configured such that:
  while the wall bracket is connected to the wall frame, a receiving space is defined between the wall frame and the retaining flange of the wall bracket, such that a mounting-ready wall frame is established; and
for each one of the at least one mountable wall panel configuration, independently, the mounting-ready wall frame and the mountable wall panel configuration are co-operatively configured such that the mountable wall panel configuration is receivable by the mounting-ready wall frame, and the receiving of the mountable wall panel configuration by the mounting-ready wall frame is with effect that:
  the retainable flange of the panel bracket becomes received within the receiving space; and
  the wall panel, of the mountable wall panel configuration, becomes disposed in contact engagement with the ledge, such that the wall panel becomes seated on the ledge.

37. The system as claimed in claim 36; wherein:
for each one of the at least one mountable wall panel configuration, independently, the mounting-ready wall frame and the mountable wall panel configuration are co-operatively configured such that:
  the receiving of the retainable flange of the panel bracket within the receiving space is such that the retaining flange of the wall bracket is disposed in opposition to displacement of the retainable flange of the panel bracket away from the wall frame;
  such that displacement of the wall panel away from the wall frame is opposed.

38. The system of claim 36; wherein:
for each one of the at least one mountable wall panel configuration, independently, the mounting-ready wall frame and the mountable wall panel configuration are co-operatively configured such that:
  the receiving of the retainable flange of the panel bracket within the receiving space is such that the retaining flange of the wall bracket is opposing displacement of the retainable flange of the load bracket along an axis that is normal to a surface of the wall frame to which the mounting flange of the wall bracket is mounted;
  such that displacement of the wall panel, relative to the wall frame, in a direction along an axis that is normal to a surface of the wall frame, is opposed.

39. The system of claim 36; wherein:
the mounting flange of the wall bracket includes a wall-abutting surface configured for disposition in an abutting relationship relative to the wall frame;
the ledge of the wall bracket includes a seating surface, for effecting the seating of the wall panel on the ledge; and
the seating surface has a normal axis that is perpendicular to a normal axis of the wall-abutting surface of the mounting flange of the wall bracket.

40. The system of claim 36; wherein:
for each one of the at least one mountable wall panel configuration, independently, the mounting-ready wall frame and the mountable configuration are co-operatively configured such that, while the mountable configuration is received by the mounting-ready wall frame:
  there is an absence of vertical support of the retainable flange of the panel bracket by the wall bracket.

41. The system of claim 36; wherein:
each one of the at least one wall panel, independently, includes a glass panel.

42. The system of claim 36; wherein:
the each one of the at least one wall panel, independently, is a composite wall panel; and
the composite panel includes a glass panel an a reinforcing substrate connected to the rear surface of the glass panel.

43. The system of claim 36; wherein:
the at least one wall panel is a plurality of wall panels.

44. The system of claim 36, wherein the seating of the wall panel on the ledge is such that the wall panel is vertically supported by the ledge.

45. The system of claim 36, wherein the wall frame and the wall bracket are further co-operatively configured such that, while the mounting-ready wall frame is established, the ledge extends perpendicularly from the wall frame.

46. The system of claim 36, wherein the mounting-ready wall frame and the mountable wall panel configuration are further co-operatively configured for emplacement of the mountable wall panel configuration into alignment with mounting-ready wall frame such that an aligned relationship is established, and the receiving of the mountable wall panel configuration by the mounting-ready wall frame is effectible, while the aligned relationship is established, in response to downwardly displacement of the mountable wall panel configuration relative to the mounting-ready wall frame.

47. The system of claim 46, wherein the aligned relationship is established while:
the retainable flange of the panel bracket is disposed in vertical alignment with the receiving space.

48. The system of claim 36, wherein the wall panel defines a planar surface, wherein the contact engagement is effectuated between the planar surface and the ledge.

49. The system of claim 48, wherein the planar surface is a bottom surface of the wall panel.

50. The system of claim 36, wherein the receiving of the mountable wall panel configuration by the mounting-ready wall frame is with effect that the mountable wall panel configuration becomes mounted to the mounting-ready wall frame such that a mounted wall panel configuration is established.

51. The system of claim 50, wherein the mounting of mountable wall panel configuration to the mounting-ready wall frame is such that the mountable wall panel configuration is hung from the mounting-ready wall frame.

52. The system of claim 51, wherein the wall frame extends from a floor, and the mounting-ready wall frame and the mountable wall panel configuration are co-operatively configured such that, while the mounted wall panel configuration is established, the wall panel is level with the floor.

53. A mounting system for mounting a load to a wall frame, comprising:
a wall bracket including:
a mounting flange for mounting the load bracket to the wall frame;
a retaining flange; and
a ledge;
a load bracket including:
a mounting flange for mounting the load bracket to the load; and
a retainable flange;
the wall frame and the wall bracket are co-operatively configured such that:
while the wall bracket is connected to the wall frame:
a receiving space is defined between the wall frame and the retaining flange of the wall bracket;
such that a mounting-ready wall frame is established;
the load and the load bracket are co-operatively configured such that:
while the load bracket is connected to the load, a mountable configuration is established;
and
the mounting-ready wall frame and the mountable configuration are co-operatively configured such that the mountable configuration is receivable by the mounting-ready wall frame, and the receiving of the mountable configuration by the mounting-ready wall frame is with effect that:
the retainable flange of the load bracket becomes received within the receiving space; and
the load, of the mountable configuration, becomes disposed in contact engagement with the ledge, such that the load becomes seated on the ledge.

54. The system as claimed in claim 53; wherein:
the mounting-ready wall frame and the mountable configuration are co-operatively configured such that:
the receiving of the retainable flange of the load bracket within into the receiving space is such that the retaining flange of the wall bracket is disposed in opposition to displacement of the retainable flange of the load bracket away from the wall;
such that displacement of the mountable load away from the wall frame is opposed.

55. The system of claim 53; wherein:
the mounting-ready wall frame and the mountable configuration are co-operatively configured such that:
the receiving of the retainable flange of the load bracket within into the receiving space is such that the retaining flange of the wall bracket is opposing displacement of the retainable flange of the load bracket along an axis that is normal to a surface of the wall to which the mounting flange of the wall bracket is mounted;
such that displacement of the mountable load, relative to the wall frame, in a direction along an axis that is normal to a surface of the wall frame, is opposed.

56. The system of claim 53; wherein:
the mounting flange of the wall bracket includes a wall frame-abutting surface configured for disposition in an abutting relationship relative to the wall frame to which the mounting flange is mountable;
the ledge of the wall bracket includes a seating surface, for effecting the seating of the load on the ledge; and
the seating surface has a normal axis that is perpendicular to a normal axis of the wall frame-abutting surface of the mounting flange of the wall bracket.

57. The system of claim 53; wherein:
the mounting-ready wall frame and the mountable configuration are co-operatively configured such that, while the mountable configuration is received by the mounting-ready wall frame:
there is an absence of vertical support of the retainable flange of the load bracket by the wall bracket.

58. The system of claim 53, wherein the seating of the load on the ledge is such that the load is vertically supported by the ledge.

59. The system of claim 53, wherein the wall frame and the wall bracket of the second mounting system are further co-operatively configured such that, while the mounting-ready wall frame is established, the ledge extends perpendicularly from the wall frame.

60. The system of claim 53, wherein the mounting-ready wall frame and the mountable configuration are further co-operatively configured for emplacement of the mountable configuration into alignment with mounting-ready wall frame such that an aligned relationship is established, and the receiving of the mountable configuration by the mounting-ready wall frame is effectible, while the aligned relationship is established, in response to downwardly displacement of the mountable configuration relative to the mounting-ready wall frame.

61. The system of claim 60, wherein the aligned relationship is established while:
the retainable flange of the load bracket is disposed in vertical alignment with the receiving space.

62. The system of claim 53, wherein the load defines a planar surface, wherein the contact engagement is effectuated between the planar surface and the ledge.

63. The system of claim 62, wherein the planar surface is a bottom surface of the load.

64. The system of claim 53, wherein the receiving of the mountable configuration by the mounting-ready wall frame is with effect that the mountable configuration becomes mounted to the mounting-ready wall frame such that a mounted configuration is established.

65. The system of claim 64, wherein the mounting of mountable configuration to the mounting-ready wall frame is such that the mountable configuration is hung from the mounting-ready wall frame.

66. The system of claim 65, wherein the wall frame extends from a floor, and the mounting-ready wall frame and the mountable configuration are co-operatively configured such that, while the mounted configuration is established, the load is level with the floor.

* * * * *